United States Patent [19]

Ibe et al.

[11] Patent Number: 5,084,235
[45] Date of Patent: Jan. 28, 1992

[54] DIRECT CYCLE-TYPE ATOMIC POWER PLANT WITH MEANS FOR SUPPRESSING TRANSFER FROM A LIQUID PHASE TO A VAPOR PHASE OF RADIOACTIVE NITROGEN OXIDES

[75] Inventors: Eishi Ibe; Hidetoshi Karasawa, both of Katsuta; Maroto Nagase, Hitachi; Masaharu Sakagami, Katsuta; Shunsuke Uchida; Minoru Miki, both of Hitachi; Yamato Asakura, Katsuta; Motoaki Utamura, Hitachi; Fumio Kawamura, Hitachi; Katsumi Ohsumi, Hitachi; Yoshinori Chiba, Ibaraki, all of Japan

[73] Assignees: Hitachi, Ltd., Tokyo; Hitachi Engineering Co., Ltd., Ibaraki, both of Japan

[21] Appl. No.: 554,158

[22] Filed: Jul. 19, 1990

Related U.S. Application Data

[63] Continuation of Ser. No. 257,931, Oct. 14, 1988, abandoned.

[30] Foreign Application Priority Data

Oct. 16, 1987 [JP] Japan ............................ 62-259711
Jun. 24, 1988 [JP] Japan ............................ 63-154767

[51] Int. Cl.⁵ .......................................... G21C 19/30
[52] U.S. Cl. ................................................. 376/306
[58] Field of Search ............... 376/306, 305, 308, 310, 376/331

[56] References Cited

U.S. PATENT DOCUMENTS

| 4,111,830 | 9/1978 | Bannister | 376/306 |
| 4,364,900 | 12/1982 | Burrill | 376/306 |
| 4,722,823 | 2/1988 | Honda et al. | 376/306 |
| 4,992,232 | 2/1991 | Cowan, II et al. | 376/306 |

FOREIGN PATENT DOCUMENTS

| 54-10886 | 1/1979 | Japan | 376/306 |
| 62-44693 | 2/1987 | Japan . | |

OTHER PUBLICATIONS

U.S. Application Ser. No. 07/091556, Cowan et al., 8/31/87.

Primary Examiner—Daniel D. Wasil
Attorney, Agent, or Firm—Antonelli, Terry Stout, & Kraus

[57] ABSTRACT

A direct cycle type atomic power plant provided with a means for suppressing transfer of radioactive nitrogen compounds generated by nuclear reaction in the core from the reactor water to steam, where an increase in the dose rate in the main steam system and the turbine system due to carry-over of radioactive nitrogen atom, $^{16}N$, generated in the core can be suppressed, and the radioactivity therein can be reduced.

12 Claims, 22 Drawing Sheets

FIG. II

F I G. 12
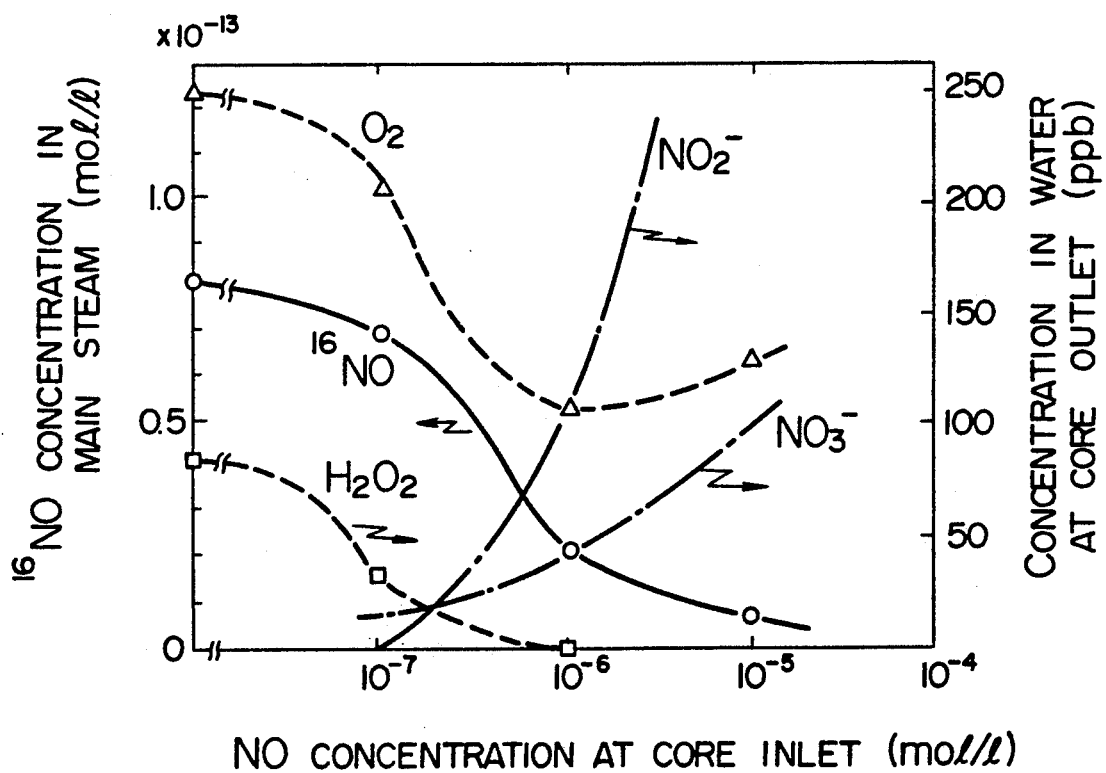

F I G. 15
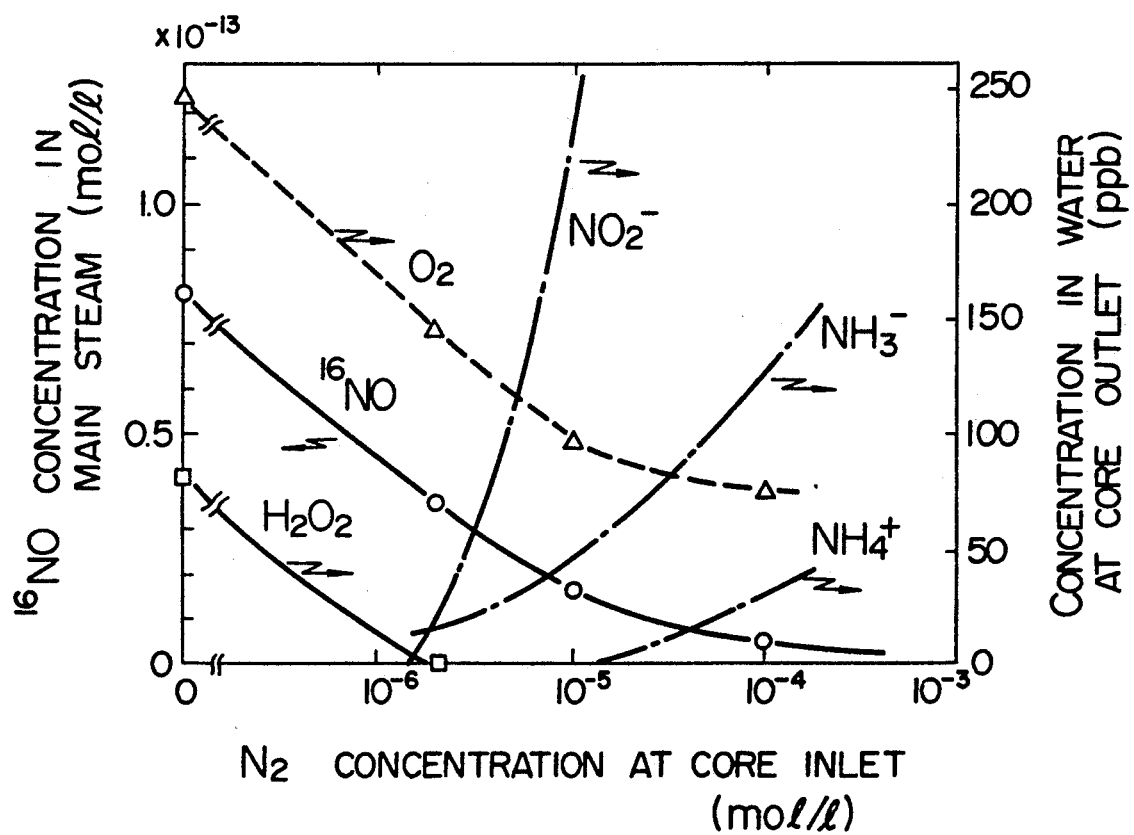

F I G. 17
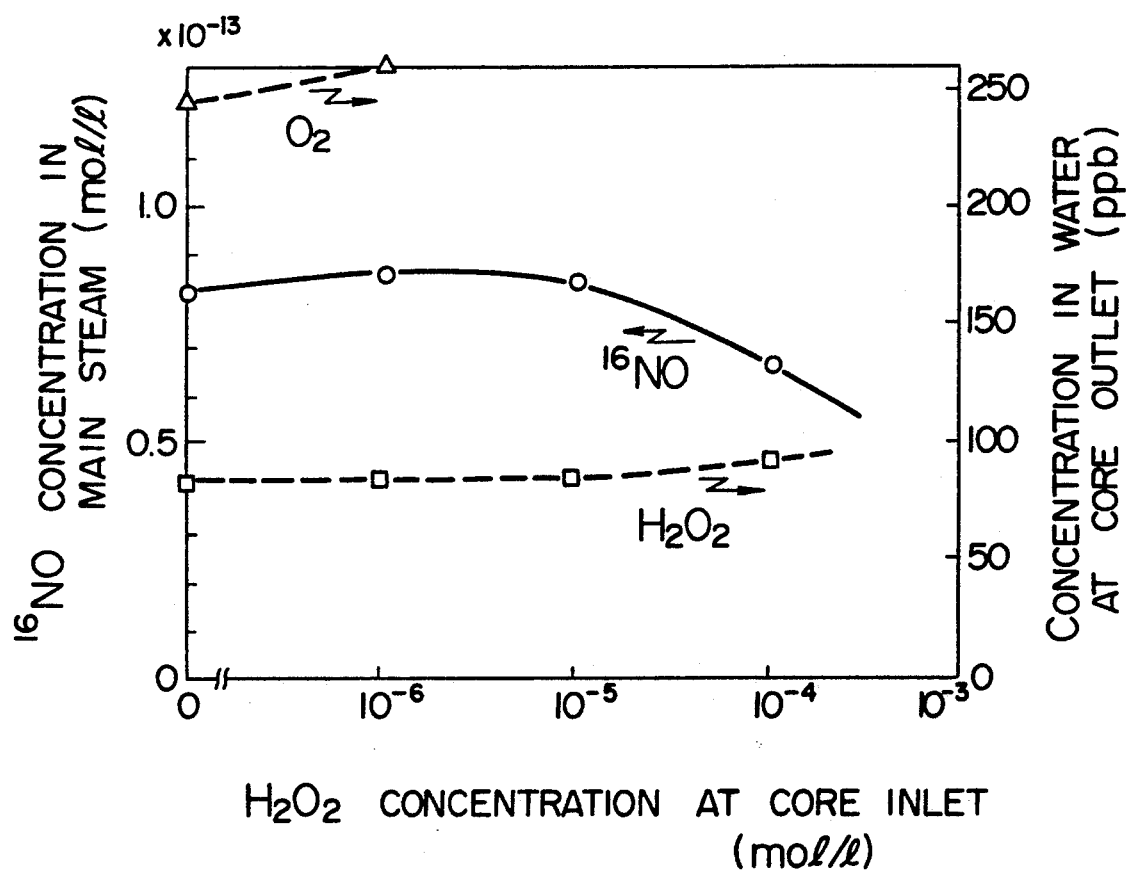

FIG. 24
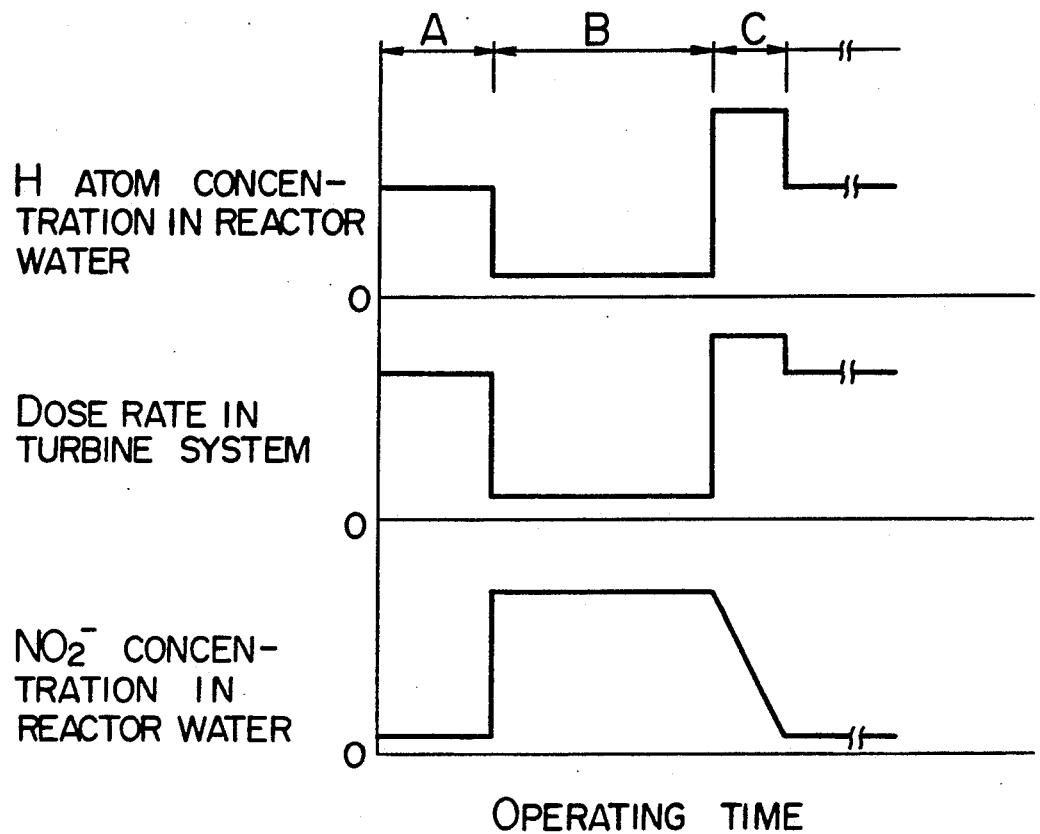
FIG. 25
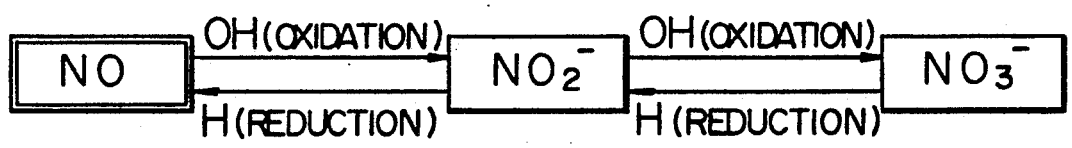
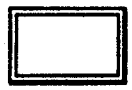 VOLATILE
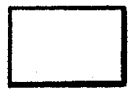 SOLUBLE

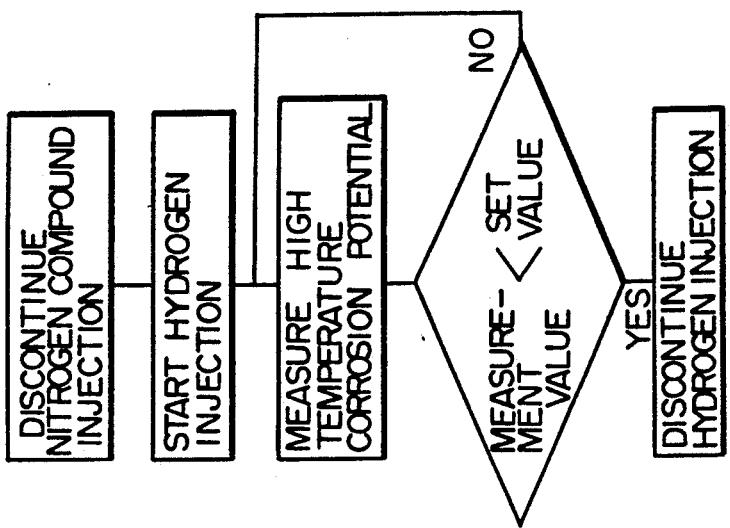
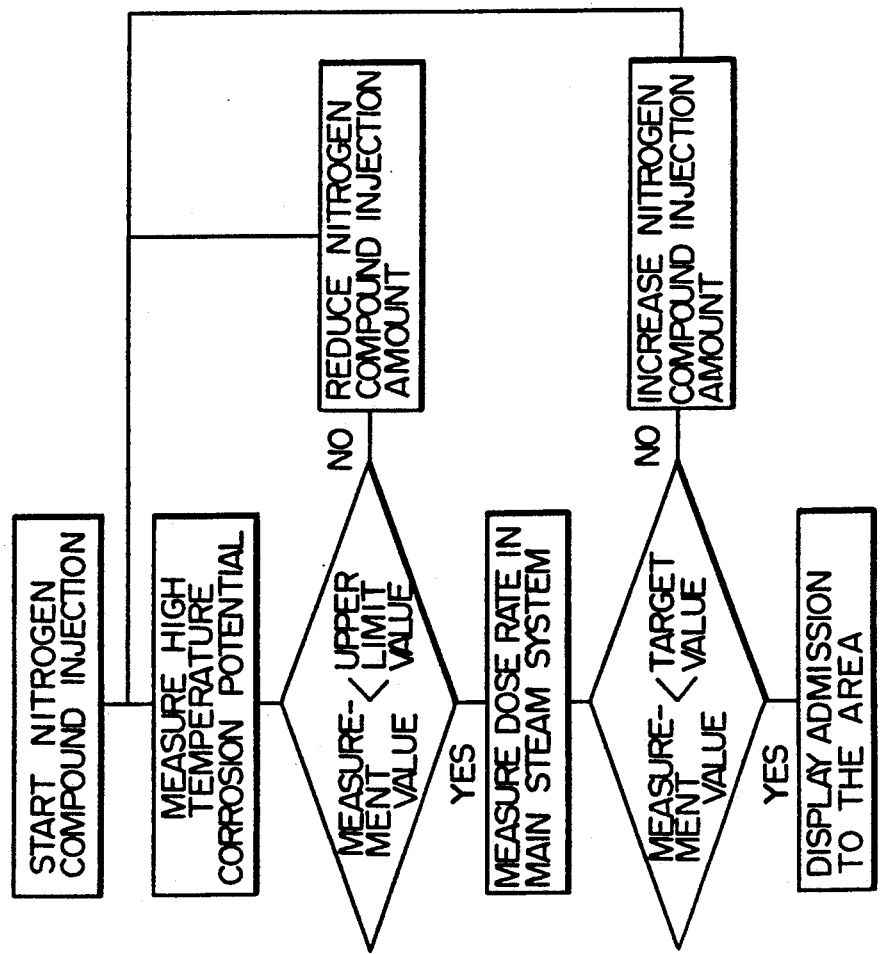
FIG. 27
a) PROCESS FLOW FOR REDUCING DOSE RATE IN MAIN STEAM SYSTEM
b) PROCESS FLOW FOR DISCONTINUING REDUCTION OF DOSE RATE IN MAIN STEAM SYSTEM

DIRECT CYCLE-TYPE ATOMIC POWER PLANT WITH MEANS FOR SUPPRESSING TRANSFER FROM A LIQUID PHASE TO A VAPOR PHASE OF RADIOACTIVE NITROGEN OXIDES

This application is a continuation of application Ser. No. 07/257,931, filed Oct. 14, 1988, now abandoned.

BACKGROUND OF THE INVENTION

This invention relates to a direct cycle-type atomic power plant, fuel rods for the plant and a method for operating the plant.

In a direct cycle-type nuclear reactor such as a boiling water nuclear reactor (BWR), an advanced thermal reactor (ATR), etc., a turbine is directly driven by the steam generated in the nuclear reactor by the heat of nuclear fission reaction in the core, and the oxygen atoms in the water molecules of nuclear reactor water, which will be hereinafter referred to as reactor water, are activated by neutron irradiation in the core, so that carry-over of the resulting radioactive nitrogen atoms $^{16}N$ causes an increase in the dose rate in the turbine system.

The increase in the dose rate due to $^{16}N$ in the turbine system amounts to a few R/h in terms of surface dose rate of the main steam piping, but must be suppressed for the following two reasons.

(1) Reduction of radiation exposure at the inspection during the nuclear reactor operation, and (2) Regulation of dose rate at the boundary of power plant site (sky-shine regulation).

For these reasons, the upper part of a main steam piping 9 and a turbine 10 are shielded with a steel plate 14, as shown in FIG. 2, but a step for suppressing generation and emission of $^{16}N$ in the nuclear reactor has not been taken yet, because their phenomena themselves have not been thoroughly studied. In atomic power plants where no steps for preventing stress corrosion crackings by use of sensitized stainless steel, as taken in Japanese nuclear reactors from the viewpoint of stress and materials, are not taken, another step for reducing the oxygen concentration of reactor water by hydrogen injection has been widely taken. In that case, there is such a problem that the $^{16}N$ concentration of the main steam increases with an increasing rate of hydrogen injection, as shown in FIG. 3, which has been found through hydrogen injection tests of 7 atomic power plants. In some atomic power plants, no hydrogen injection can be carried out owing to the sky-shine regulation. Mechanism of increase in $^{16}N$ through the hydrogen injection has not been clarified yet. For this reason, atomic power plants as disclosed in Japanese Patent Applications Kokai (Laid-open) Nos. 57-194,399 and 62-151,797 have been proposed. That is, Japanese Patent Application No. 57-194,399 proposes to provide an apparatus for removing $N_2$, but $^{16}N$ exists substantially not in the chemical form of $N_2$, but in the form of NOx and entrained into the steam in this form. That is, the apparatus for removing $N_2$ cannot remove $^{16}N$ effectively. Japanese Patent Application Kokai (Laid-open) No. 62-151,797 proposes to provide an apparatus for injecting a $N_2$ gas, but has such a disadvantage that the efficiency of isotope exchange reaction between $^{14}NH$ and $^{16}NH$ is not good.

Steel plate shielding has been only a step for $^{16}N$ in the turbine system, but has the following problems.

(1) Energy of gamma rays emitted from $^{16}N$ is as high as 6-7 MeV, and the necessary thickness of steel plates for the shielding amounts to about 150 mm. In other words, the total weight of steel plates covering the main steam piping and turbine proper amounts to a few hundred tons. That is, the turbine house itself must be in a structure that can support such a heavy weight and is also subject to a very severe design regulation from the viewpoint of earthquake and load resistances.

(2) At the regular inspection of an atomic power plant, the main steam piping and the turbine are disassembled and subjected to repairing, if any, and the working for the disassembling and repairing is quite hard owing to such heavy shielding steel plates.

(3) In case of hydrogen injection, the dose rate increases about 5 times the normal dose rate as shown in FIG. 3. When the dose rate is to be reduced by shielding, the turbine house itself must be sometimes in such a large structure as mentioned above owing to the heavy weight of the shielding steel plates.

Thus, the step for reducing $^{16}N$ dose rate by shielding is not satisfactory for the above reasons.

SUMMARY OF THE INVENTION

An object of the present invention is to reduce an absolute amount of $^{16}N$, as generated in the reactor water, to be transferred into the main steam system.

This object can be attained by proving a means for suppressing transfer of radioactive nitrogen oxides, as generated by nuclear reaction in the nuclear reactor core of direct cycle-type, atomic power plant, from the reactor water into the steam. Furthermore, this object can be also attained in a direct cycle-type, atomic power plant comprising a nuclear reactor, a turbine, a condensate water-purifying equipment, a feed water heater and a reactor water-purifying apparatus as essential members, where (a) a means for injecting a hydrogen radical scavenger having an action to lower the hydrogen concentration through reaction with hydrogen atoms in the reactor water in order to convert radioactive nitrogen oxides in the reactor water to anions and (b) a means for injecting a hydrogen radical-generating agent for reducing and removing the hydrogen radical scavenger in excess in the reactor water are provided.

BRIEF DESCRIPTION OF THE DRAWINGS

FIG. 6 to FIG. 10 show results at water temperatures of 15° C., 60° C., 100° C., 150° C. and 200° C., respectively.

FIGS. 12 to 16 are diagrams showing changes in concentration of $^{16}NO$ in steam and concentrations of oxygen, hydrogen peroxide, nitric acid and nitrous acid in the reactor water at the injection of various nitrogen oxides and nitrogen molecules, where FIGS. 12 to 16 show injections $NO_2$, $NO_2$, $NO_2^-$, $N_2$ and $N_2O$, respectively.

FIG. 17 is a diagram showing changes in concentration of $^{16}NO$ in the main steam and in concentrations of oxygen and hydrogen peroxide in the reactor water at hydrogen peroxide injection.

FIG. 24 is a diagram showing changes in concentration of hydrogen atoms, dose rate in the turbine system and concentration of $NO_2^-$ when $NO_2^-$ and $H_2$ are alternatingly injected to the reactor water.

FIG. 25 is a diagram showing oxidation and reduction reactions of $NO_2$.

FIG. 27 is a diagram showing a procedure for controlling $NO_2^-$ and $H_2$ injections.

DETAILED DESCRIPTION OF THE INVENTION

Figure 4:
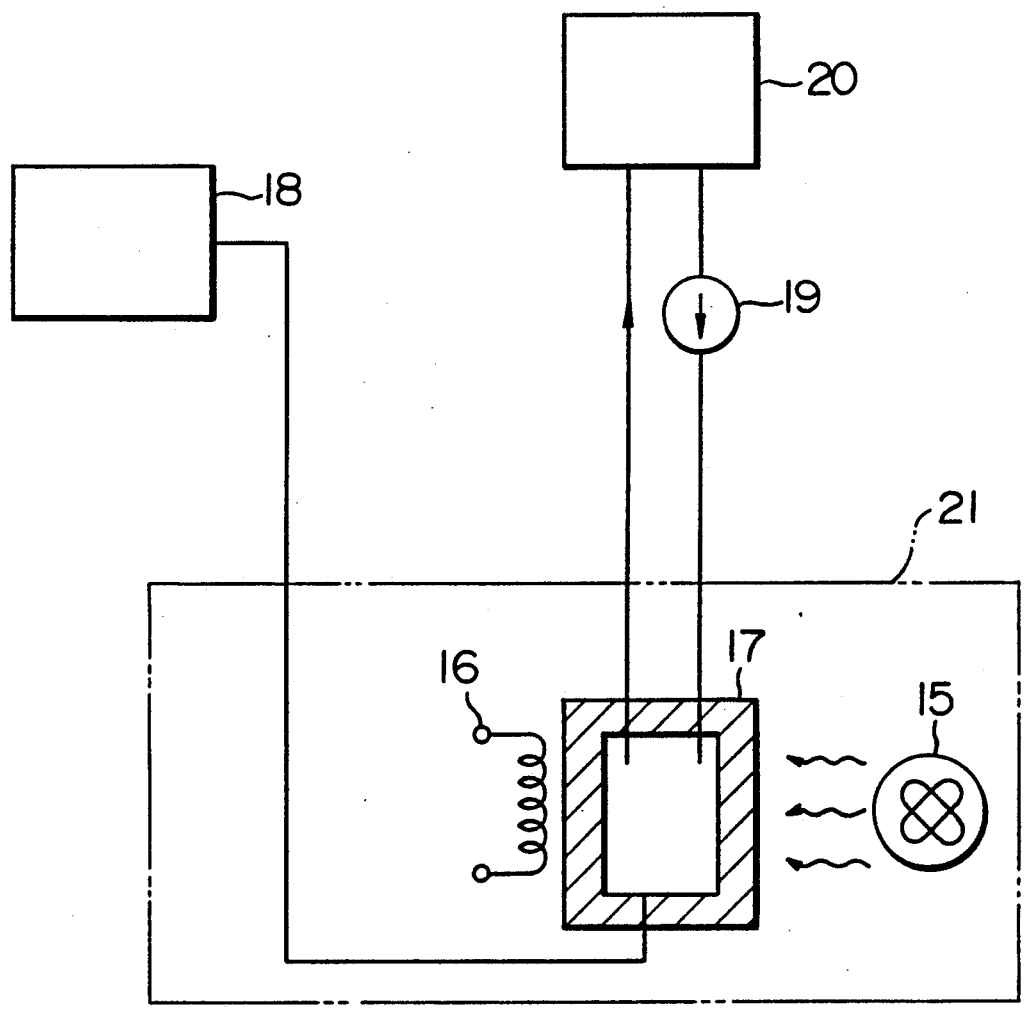
FIG. 4 is a block diagram of a test apparatus made for evaluating the radiolysis of nitrogen-dissolved water.

According to the present invention, such a nature that $^{16}N$ is converted to a non-radioactive oxygen atom at a half life of 7.2 seconds is utilized at first. That is, if $^{16}N$ can be retained in a liquid phase or a solid phase in a nuclear reactor pressure vessel for a time as much as or more than the half life of $^{16}N$, $^{16}N$ can be reduced to a half or less concentration in the main steam. The means for retaining it in a liquid phase or a solid phase is based on the following findings. That is, (1) The present inventors made a test apparatus, as shown in FIG. 4, to clarify the mechanism of $^{16}N$ into the main steam system. Water containing nitrogen and hydrogen as dissolved in advance was placed in an autoclave 17 from a water tank 20 through a water feed pump 19, heated to a predetermined temperature with a heater 16 and subjected to gamma ray irradiation from a gamma ray source 15 to make reaction of the hydrogen and the nitrogen with radiolysis products of water, and the concentration of the resulting ammonia was measured through a water quality-measuring device 18. The results are shown in FIGS. 6 to 10 as round marks at temperatures of 15°, 60°, 100°, 150° and 200° C., respectively.

Figure 5:
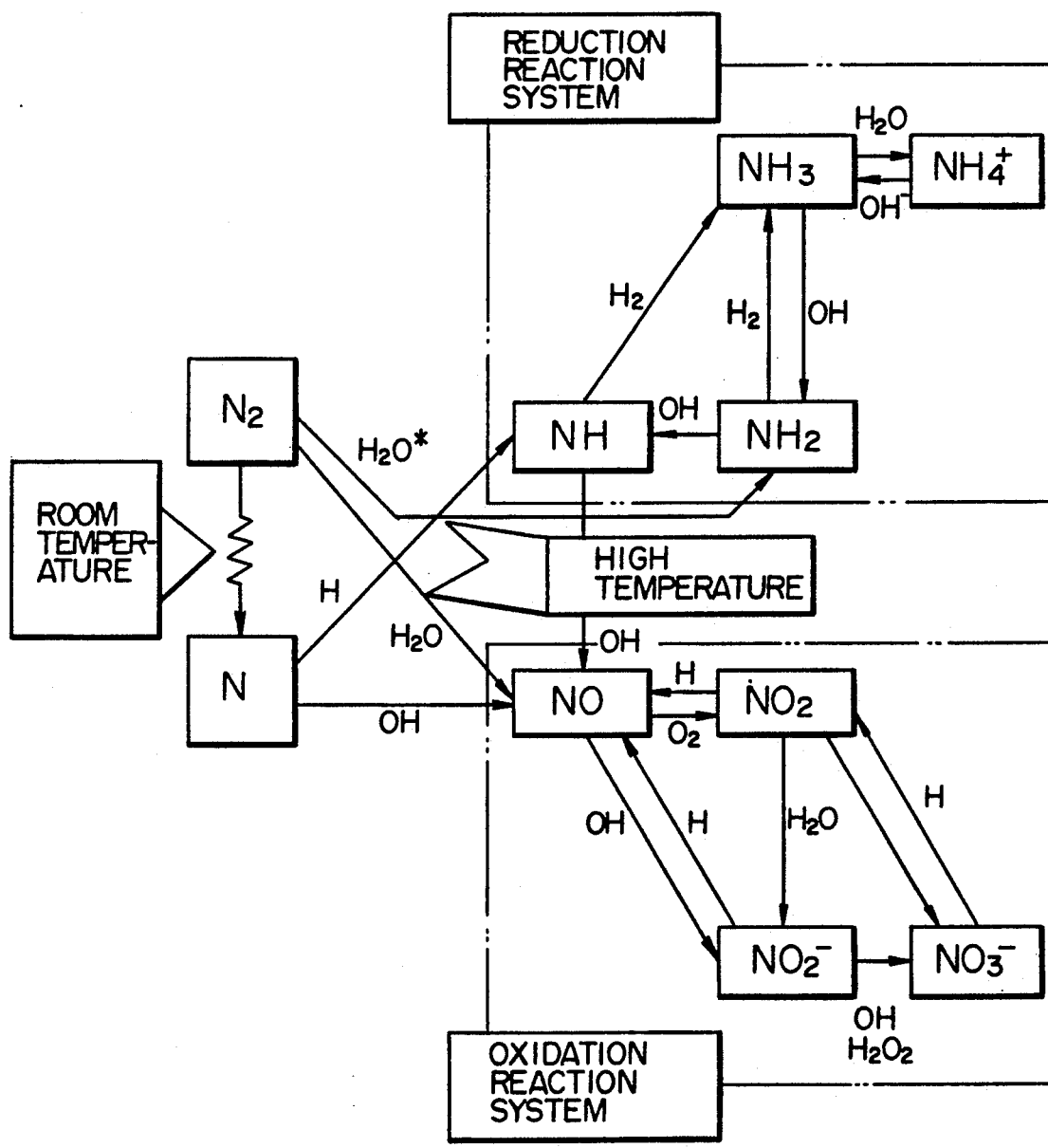
FIG. 5 is a diagram showing interrelations between nitrogen compounds.
Figure 6:
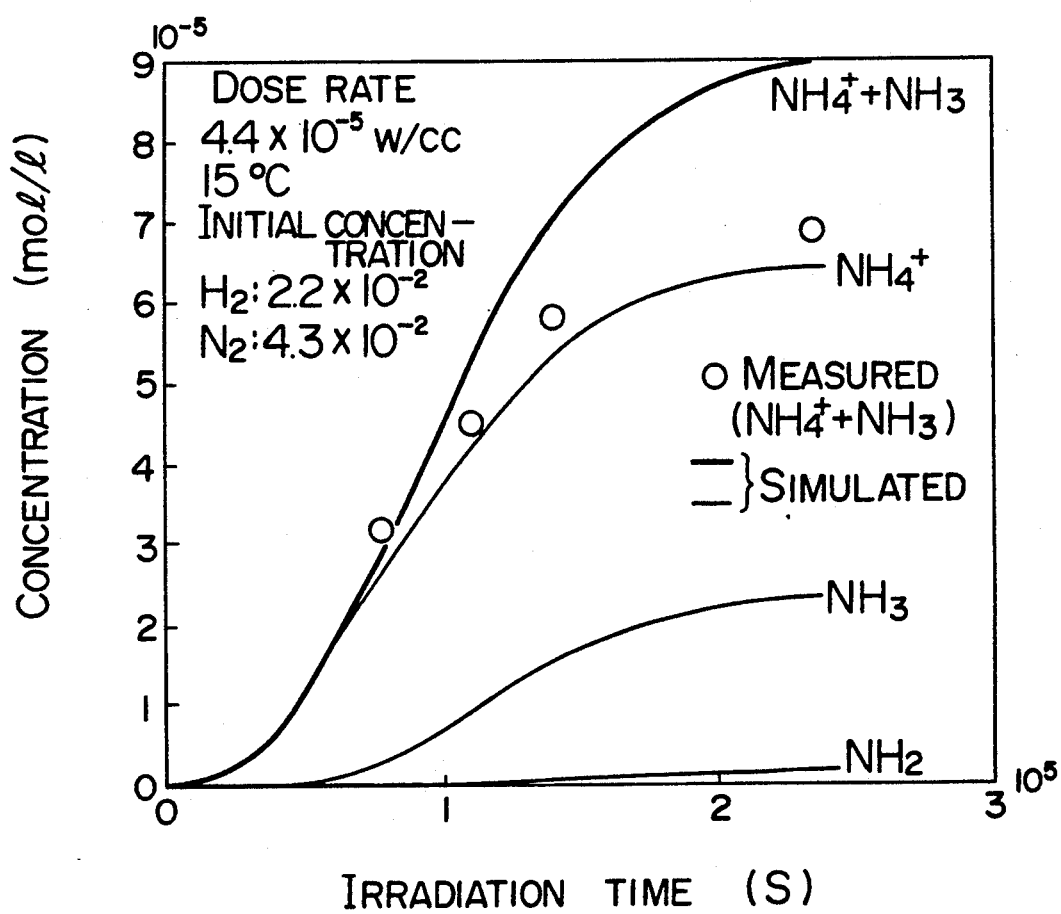
FIGS. 6 to 10 are diagrams showing results of actually measured concentrations of ammonia formed in water when nitrogen and hydrogen are added to the water and numerical simulation results by a computer, where
Figure 7:
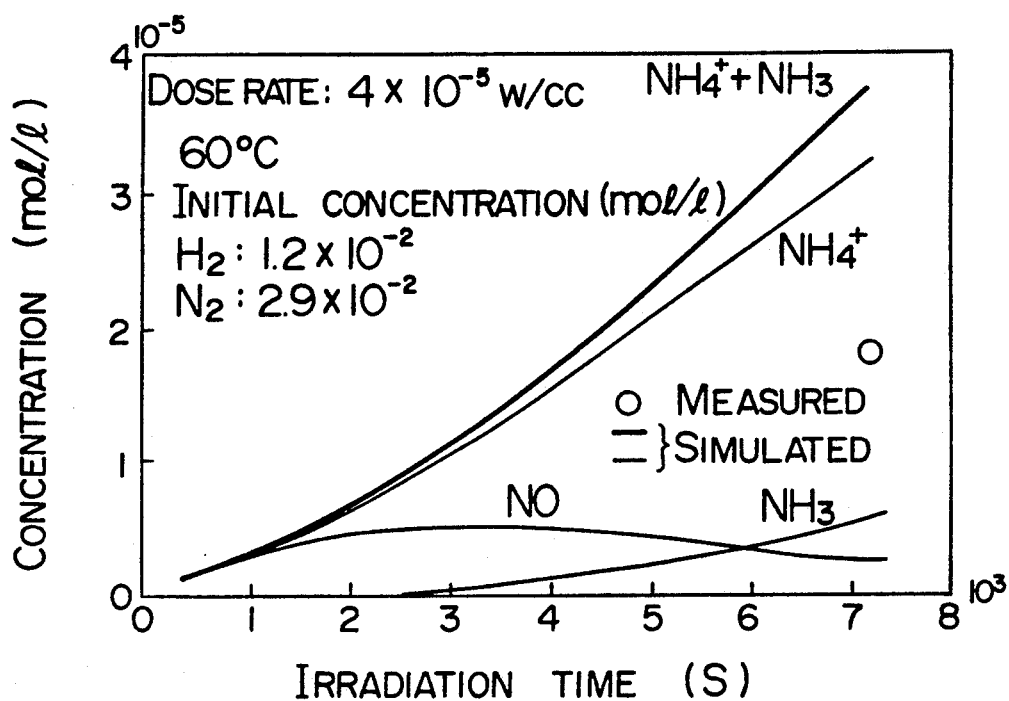
Figure 8:
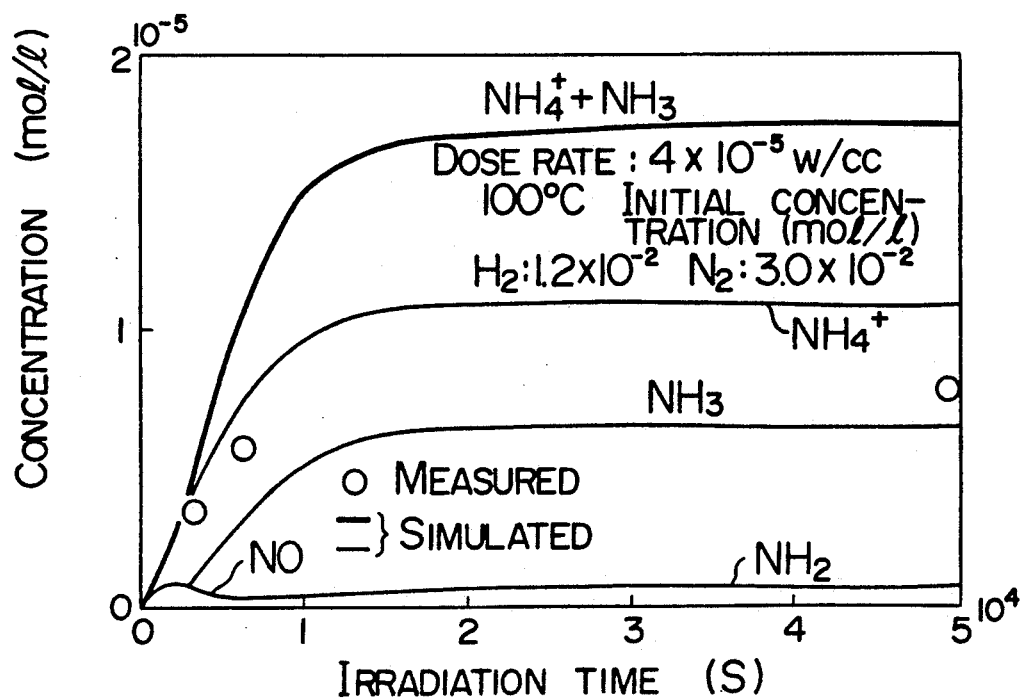
Figure 9:
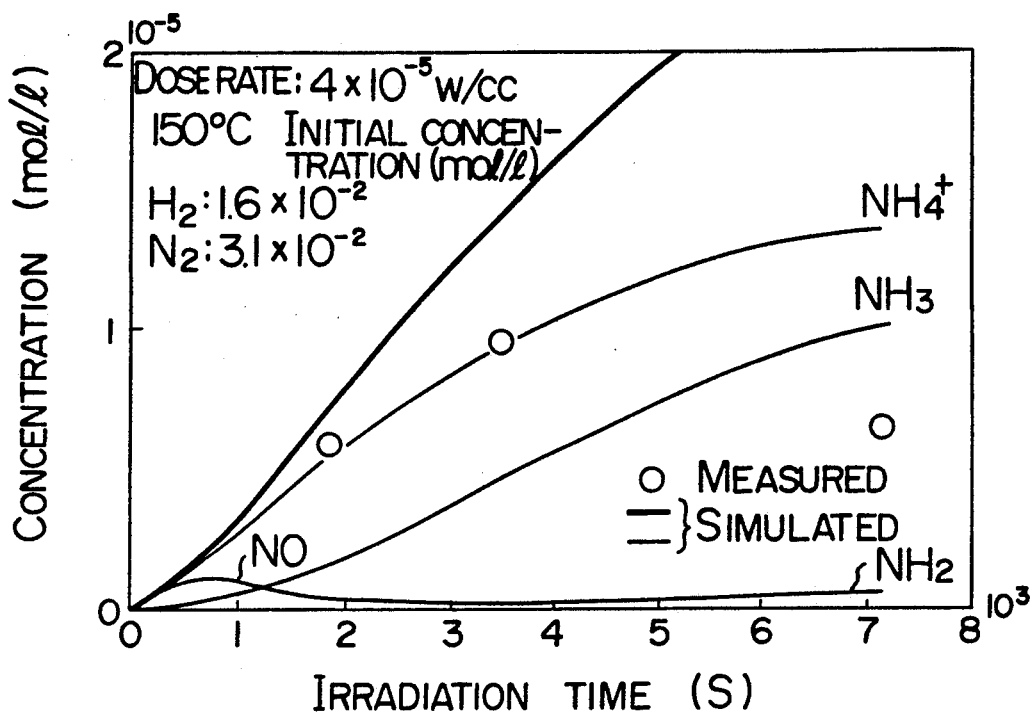
Figure 10:
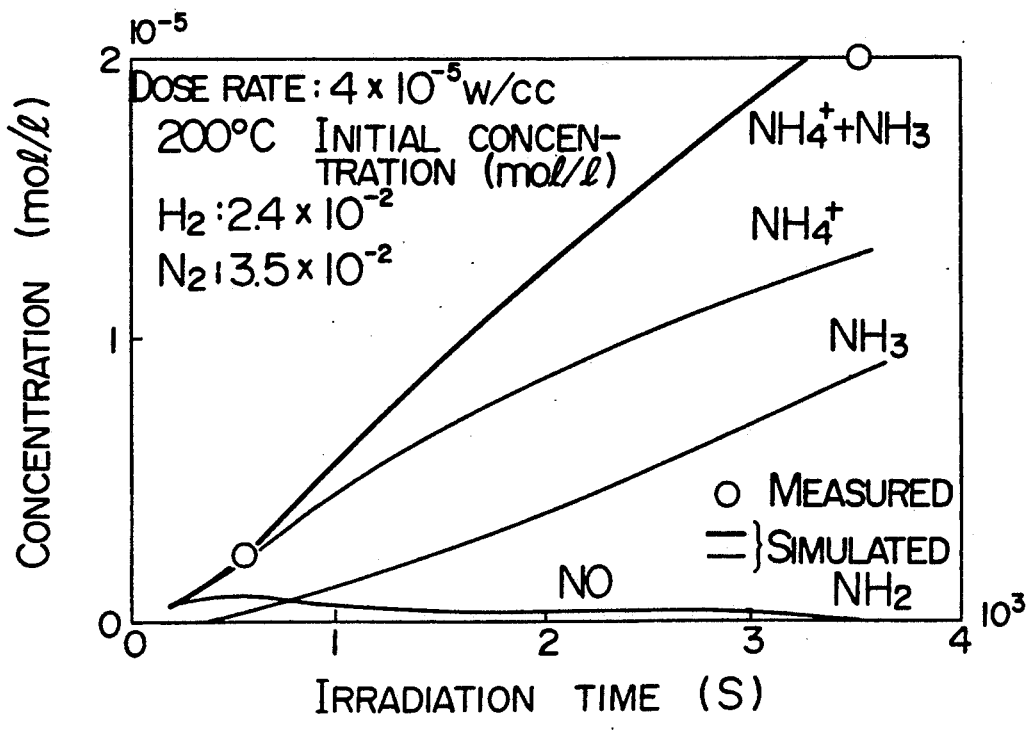

(2) The present inventors have made a reaction scheme of major components, as shown in FIG. 5, from the thus obtained test results on the basis of literature investigation and observation of the test results and also have made numerical simulation by a computer on the basis of reaction rate constants of total 75 reactions. The numerical simulation results are also shown in FIGS. 6 to 10 as full lines. The numerical simulation results are in agreement with the actual measurements by a factor of about 2 throughout the temperature range of 15° to 200° C.. They are also in a good agreement with each other in such tendencies that the increase in the concentration of ammonia tends to be saturated at a low temperature, while it tends to be linear at 200° C.

Figure 11:
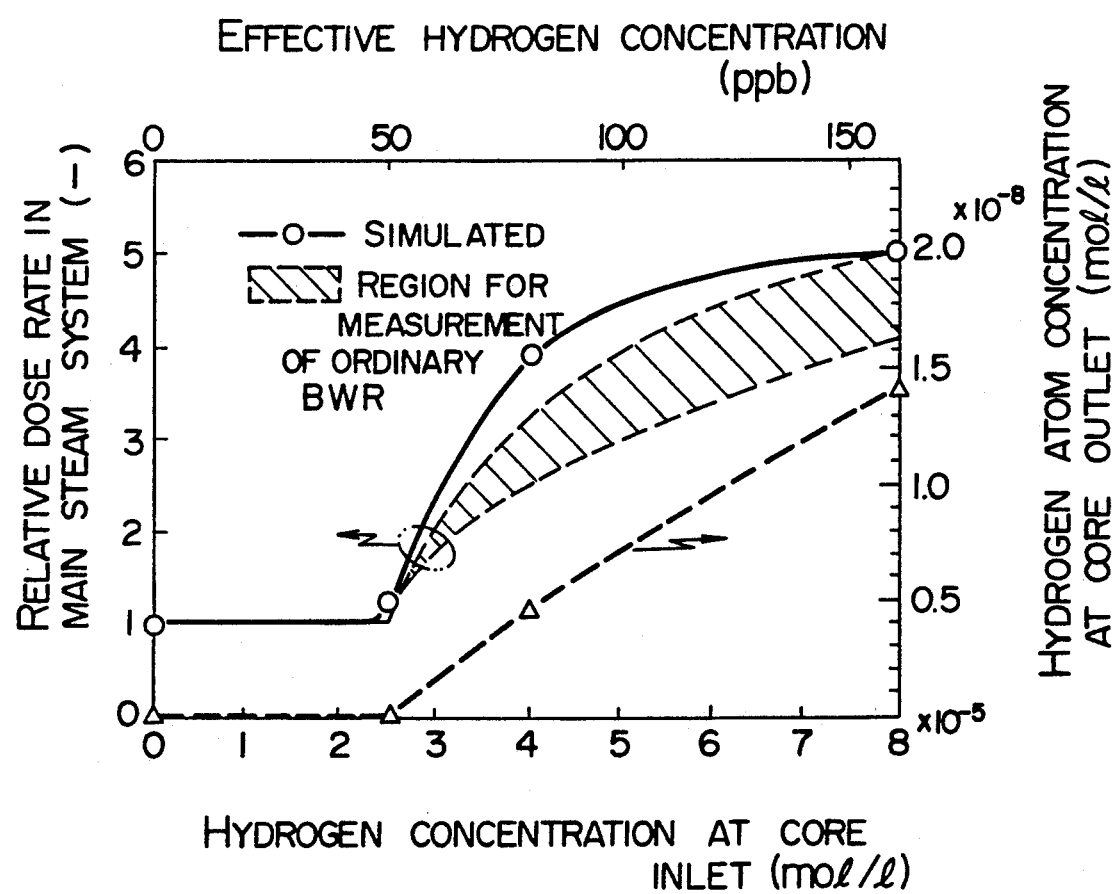
FIG. 11 is a diagram showing simulated $^{16}NO$ increase rates in a turbine system of a boiling water-type nuclear reactor at hydrogen injection tests in comparison with the measured values and simulated concentrations of hydrogen atoms in the reactor water.

(3) Simulation results of an increase rate of the concentration of $^{16}N$ in the turbine system in hydrogen injection tests with European and American plants on the basis of the same reaction scheme are shown in FIG. 11. Simulated values are in a good agreement with measurements of ordinary BWR plants in the increase rate and the hydrogen concentration at start to increase at the core inlet. Thus, the reaction scheme as made is substantially realistic as a model for evaluating the $^{16}N$ dose rate.

(4) New finding from the results of FIG. 11 is that the $^{16}N$ to be transferred into the turbine system mostly takes a chemical form of nitrogen monoxide and not of ammonia which has been so far presumed.

This will be explained, referring to FIG. 5 showing the interrelations of the components.

$^{16}N$ formed from the oxygen atoms of water molecules in the core reacts with hydrogen atoms among the radiolysis products of water to form NH, which is further reduced to ultimately form ammonia. The rate constants are relatively low in this reaction process route, and thus NO as a reaction product of N and OH is the major component initially formed from $^{16}N$, and is a relatively stable gas and thus is discharged into steam.

When the atmosphere is oxidative on the other hand, NO is oxidized with OH radicals, etc. and is converted to involatile nitrous acid, nitric acid, etc. At the normal operation without any hydrogen injection, about 80% of $^{16}N$ can be retained in water as nitric acid.

When hydrogen is injected thereinto, nitric acid is converted to nitrous acid with hydrogen atoms formed from the injected hydrogen. The hydrogen atoms are formed from the injected hydrogen according to the following reaction (1).

$$H_2 + OH \rightarrow H + H_2O \tag{1}$$

Thus, $^{16}N$ in the main steam is also increased. However, the concentration of hydrogen atoms is not immediately increased by the hydrogen injection, but the injected hydrogen is consumed up to some concentration only in reactions with oxygen or hydrogen peroxide as given below:

$$H + O_2 \rightarrow H_2O \tag{2}$$

$$H + H_2O_2 \rightarrow H_2O + OH \tag{3}$$

Thus, the concentration of hydrogen atoms is not increased until the concentrations of oxygen and hydrogen oxide are thoroughly lowered, as given also in FIG. 11. It is obvious from FIG. 11 that the dose rate starts to increase at the point where the increase in the concentration of hydrogen atoms becomes remarkable.

In summary, (i) $^{16}N$ is discharged into the main steam system in the chemical form of NO.

(ii) Rate of $^{16}NO$ to be discharged is increased with increasing concentration of hydrogen atoms.

Thus, the rate of $^{16}N$ discharge to the vapor phase is determined primarily by the following simplified equilibrium reactions:

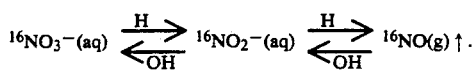

Thus, the reduction of $^{16}N$ can be attained by the following means:

(1) by decreasing the concentration of hydrogen atoms or increasing the concentration of OH radicals, thereby decreasing the equilibrium concentration of $^{16}NO$ in thereby converting it into non molecular components, (2) by allowing $^{16}NO$ to react with some oxidizing component, thereby converting it into non molecular components, (3) by scavenging $^{16}NO$ with a scavenger in water for a predetermined time or more, or (4) by increasing the concentration of $^{14}NO$ having similar chemical properties in advance, thereby suppressing transfer (or discharge) of $^{16}NO$ from the liquid phase into the steam phase on the basis of a gas-liquid equilibrium relationship.

For this purpose, a hydrogen scavenger having an action to decrease the concentration of hydrogen atoms through reaction with the hydrogen atoms must be injected into the reactor water in order to convert radioactive nitrogen oxides into anions in the reactor water. Injection of the scavenger into the reactor water can be made not always by direct injection into the water in the core of the nuclear reactor, but by injection into the feed water or condensate water system. The foregoing step must be effectively taken only in the region between the core and the separator outlet, because the two-phase stream is dominant as far as the separator outlet, and $^{16}N$ retained in the liquid phase turns into stable $^{16}O$ through radioactive decay while being circulated through the primary system, irrespective of its chemical form, and has no more influence upon the dose rate in the main steam system. That is, the transfer of $^{16}N$ from the liquid phase into the gas phase must be retarded on average in the flow passage to the separator outlet by any of the foregoing means of (1) to (4), whereby the reduction of $^{16}N$ in the main steam system can be attained.

The effectiveness of the step particularly from the viewpoint of decreasing the concentration of hydrogen atoms or increasing the concentration of OH will be given below, where NO, $NO_2$ and $NO_2^-$ are selected as components and the effect on the reduction of $^{16}NO$ is evaluated by analysis.

Figure 13:
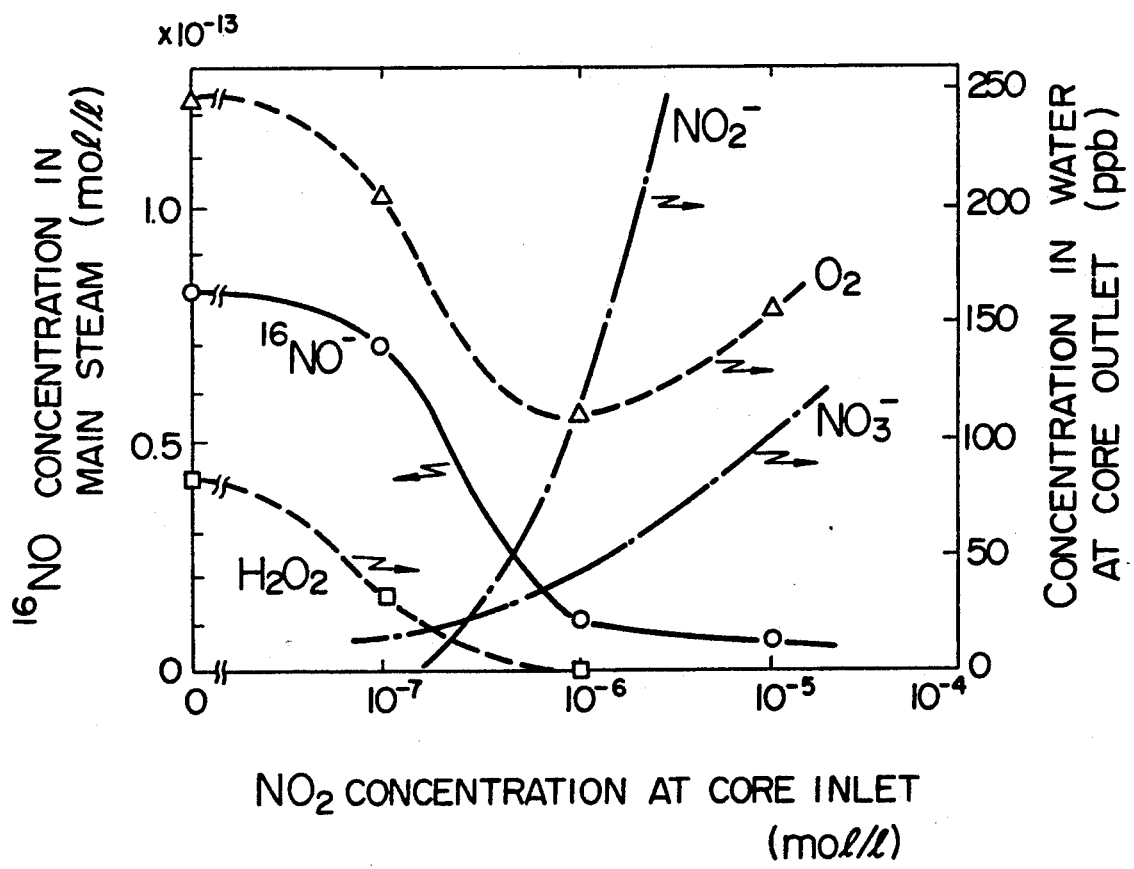
Figure 14:
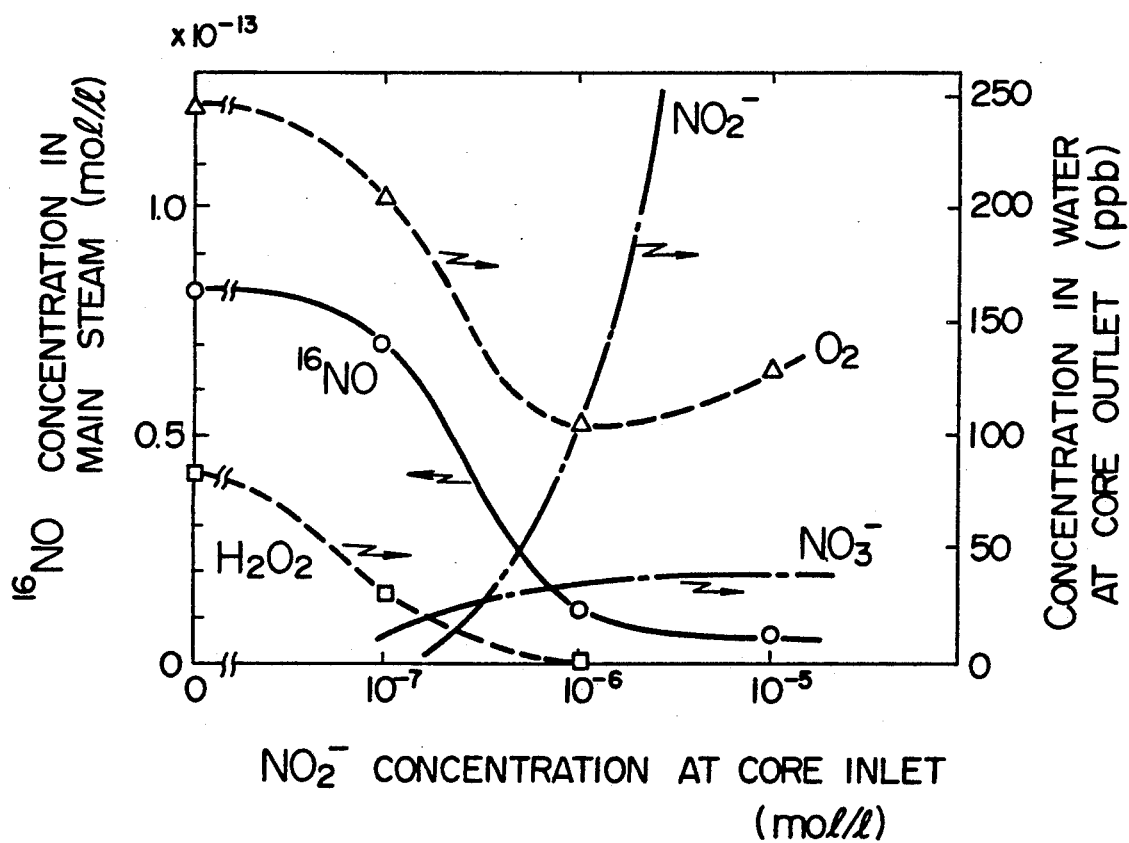

FIGS. 12 to 14 show calculated values of concentration of $^{16}NO$ in the steam, and of concentrations of oxygen, hydrogen peroxide, nitric acid and nitrous acid in the reactor water when the rates of the selected components are changed. It is obvious from FIGS. 12 to 14 that the concentration of $^{16}NO$ can be decreased by about one order by maintaining a concentration of $10^{-6}-10^{-5}$ mol/l as a core inlet concentration in any case. Furthermore, it is also obvious therefrom that the reduction effects of oxygen and hydrogen peroxide are expectable and that the concentrations of nitric acid and nitrous acid become higher and the concentration of oxygen increases when the injection is made up to about $10^{-4}$ mol/l on the other hand. That is, too much injection is a problem. The foregoing results can be interpreted as follows. As a result of reaction of the injected components with the radiolysis products of water, the equilibrium concentration of hydrogen atoms is lowered in the process of increasing the concentration of NO, for example, according to the following reactions:

Consequently, the following reaction is hard to proceed and the concentration of OH radicals is also relatively increased.

Even if $^{16}N$ generated in the core turns into $^{16}NO$, $^{16}NO$ is liable to take a form of nitrous acid according to the following reaction:

Once $^{16}NO$ turns into nitrous acid, the following reaction is hard to proceed owing to the low concentration of hydrogen atoms:

Since the equilibrium concentration of $^{16}NO$ is decreased, as described above, the concentration of $^{16}NO$ in the main steam system can be also decreased. On the other hand, the decrease in the concentration of hydrogen peroxide or oxygen seems to be due to the following reaction:

The analytical results of $N_2$ injection are given in FIG. 15, where no more remarkable effect than that of injection of the foregoing three compounds can be obtained, because it seems that $N_2$ is partially changed into NO, $NO_2$, etc., which are not so effective, and has a high ratio of pass-through directly into the steam as $N_2$ itself. $N_2$ is not so effective, but is readily available and cheap.

In addition, silver ions, chromic acid, copper, etc. can be used in the present invention as a hydrogen radical scavenger having a reaction rate as high as that of hydrogen atoms, and the effect of decreasing $^{16}NO$ can be expected by adding these components into the reactor water.

From the foregoing results it can be seen that the most effective method for reducing the hydrogen atoms in the present invention is a method based on $NO_2$ or $NO_2^-$ injection.

In place of decreasing the concentration of hydrogen atoms, the concentration of $^{16}NO$ can be decreased by increasing the concentration of OH radicals according to the following reaction:

Figure 16:
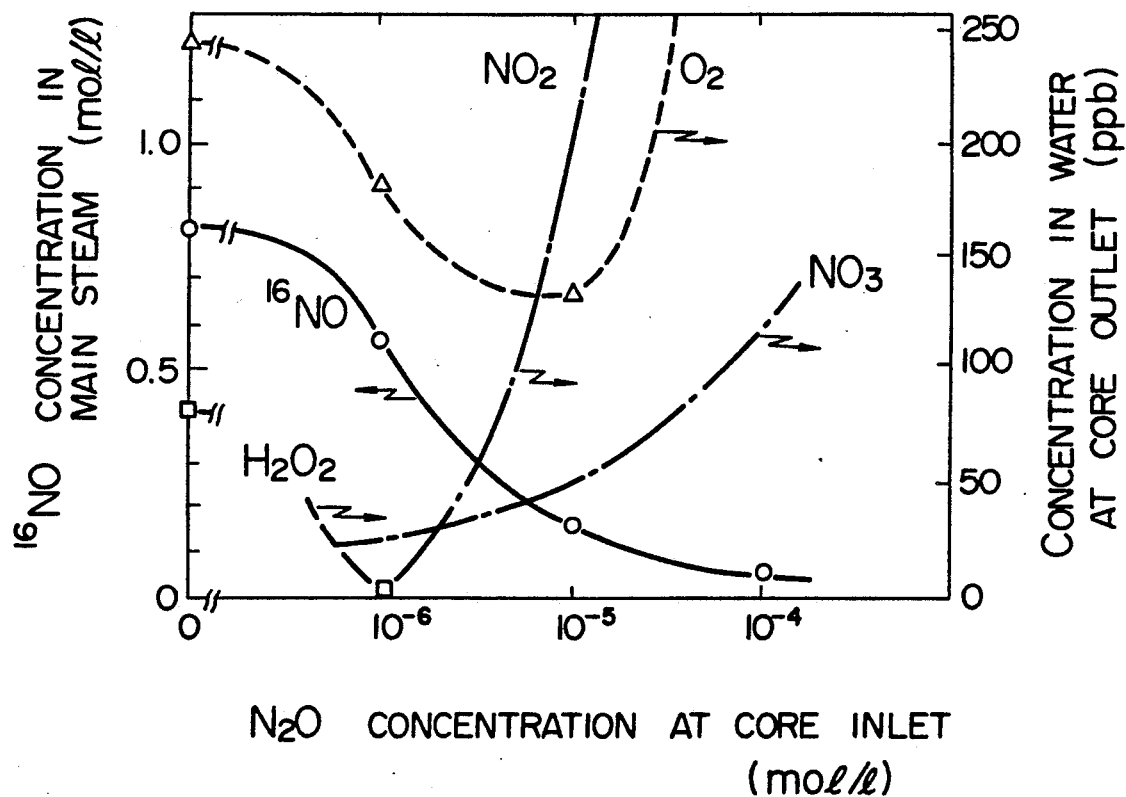

Analytical results of $N_2O$ and $H_2O_2$ injections are shown in FIGS. 16 and 17, respectively. The respective injected components have an action to increase the concentration of OH radicals in water according to the following reactions:

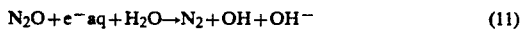

$$N_2O + e^-_{aq} + H_2O \rightarrow N_2 + OH + OH^- \quad (11)$$

$$H_2O_2 \rightarrow 2OH \quad (12)$$

It is obvious from FIGS. 16 and 17 that an increase in the concentration of OH radicals has an effect upon the decrease in $^{16}NO$, though the effect by the $H_2O_2$ injection is not so remarkable because $H_2O_2$ is thermally decomposed into oxygen before it reaches the core and passed into the gas phase in the core. Thus, it is preferable to carry out the $H_2O_2$ injection at a position near the core. In the foregoing reaction equation (11), $e_{aq}^-$ is called hydration electron, which always exists under irradiation due to the radioanalysis of water. Hydrogen peroxide also always exists under irradiation and the concentration of OH radicals can be increased by accelerating the decomposition reaction (12) of hydrogen peroxide with a catalyst, for example, platinum or transition metals.

Figure 18:
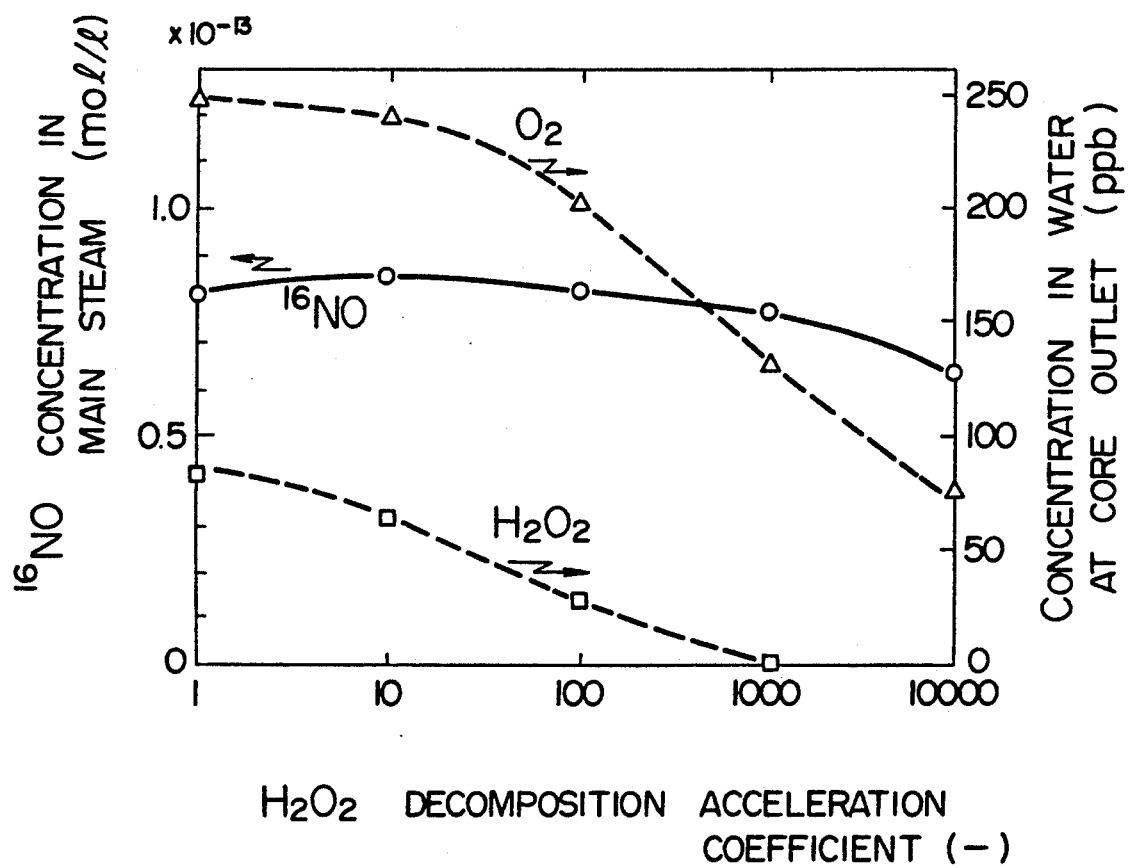
FIG. 18 is a diagram showing changes in concentration of $^{16}NO$ in the main steam and in concentrations of oxygen and hydrogen peroxide in the reactor water when the decomposition reaction of hydrogen peroxide is accelerated.

FIG. 18 shows the decrease in the concentration of $^{16}NO$ when the normal decomposition rate of hydrogen peroxide is accelerated, as shown on the abscissa, where the effect upon the decrease is observable, though not so remarkable.

The foregoing methods for decreasing the concentration of hydrogen atoms or increasing the concentration of OH radicals are not preferable, if there are a large amount of hydrogen atoms. This is because the added components react with the hydrogen atoms, impairing the effect of hydrogen injection upon the decrease in the concentration of dissolved oxygen. In a nuclear reactor, hydrogen is generated through radiolysis of water, and in the present invention it is particularly preferable to carry out the foregoing methods while suppressing the amount of hydrogen at least to such an amount of hydrogen as spontaneously generated through the radiolysis of water.

In the present invention, suppression of $^{16}N$ can be also attained in the following manner: it is apparent that $^{16}N$ is emitted in the form of NO, and thus it is also possible to reduce the amount of $^{16}N$ by adding such a component as to chemically react with NO to form an involatile compound, for example, $FeSO_4$, etc. capable of forming a complex with NO, to the reactor water. Furthermore, it is also possible to reduce the amount of $^{16}N$ by adding a nitrogen oxide-adsorbing or absorbing agent such as $PbO_2$, aluminum silicate, activated carbon, etc. to the reactor water or coating the surface of materials around the core.

In the foregoing description only the effect upon the decrease in $^{16}N$ has been explained, but the reduction effect can be also obtained upon $^{16}NH_3$ produced at the same time.

PREFERRED EMBODIMENTS OF THE INVENTION

EXAMPLE 1

One embodiment of applying the present invention to a decrease in $^{16}N$ dose rate will be described below, referring to FIG. 1, where the structure of a direct cycle-type atomic power plant at the injection stage is schematically shown. A nitrous acid-injecting apparatus 1 is provided at any site of a feed water piping 7, a condensate water-purifying apparatus 49, a reactor water-purifying system 6, a control rod-cooling apparatus 12, an in-reactor instrumentation piping 11, an emergency core quenching system 8, etc.

Figure 1:
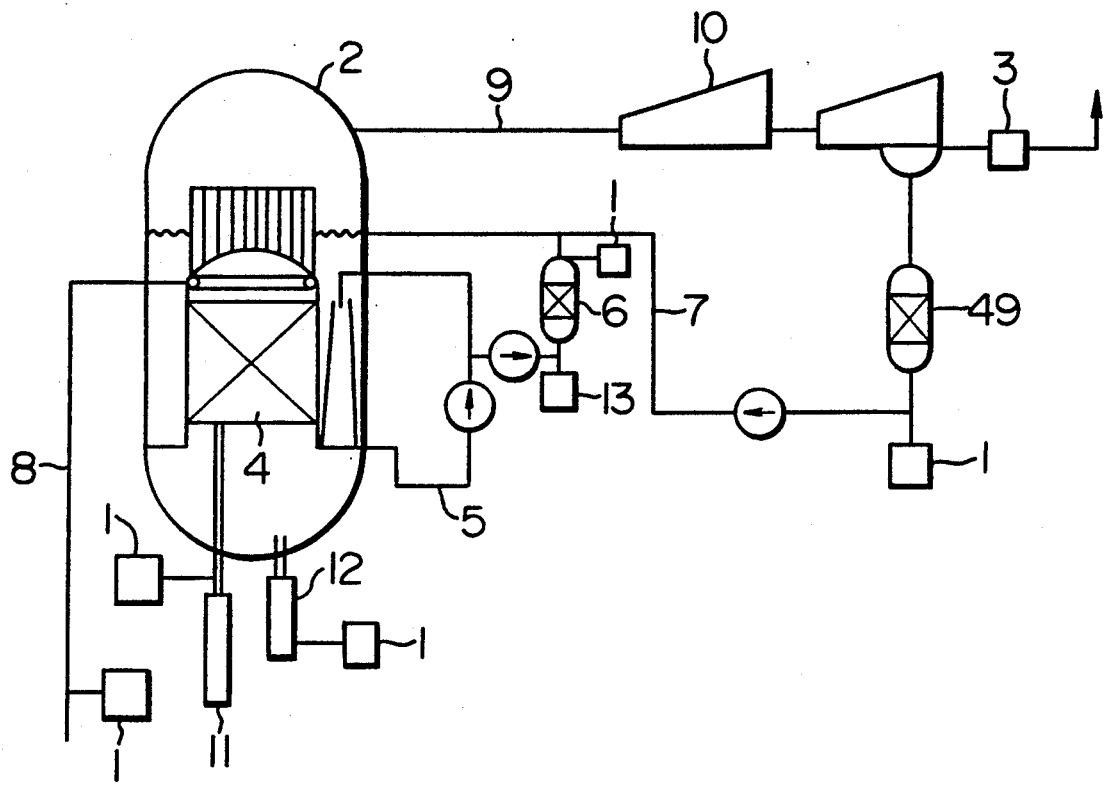
FIG. 1 is a flow diagram according to one embodiment of the present invention, as applied to a steady reduction of $^{16}N$ dose rate.
Figure 2:
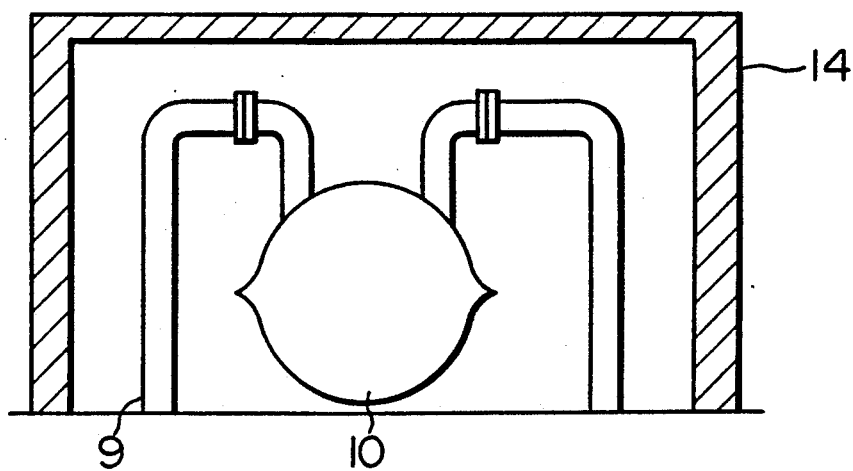
FIG. 2 is a schematic view showing an arrangement of steel plate shielding around a turbine.
Figure 3:
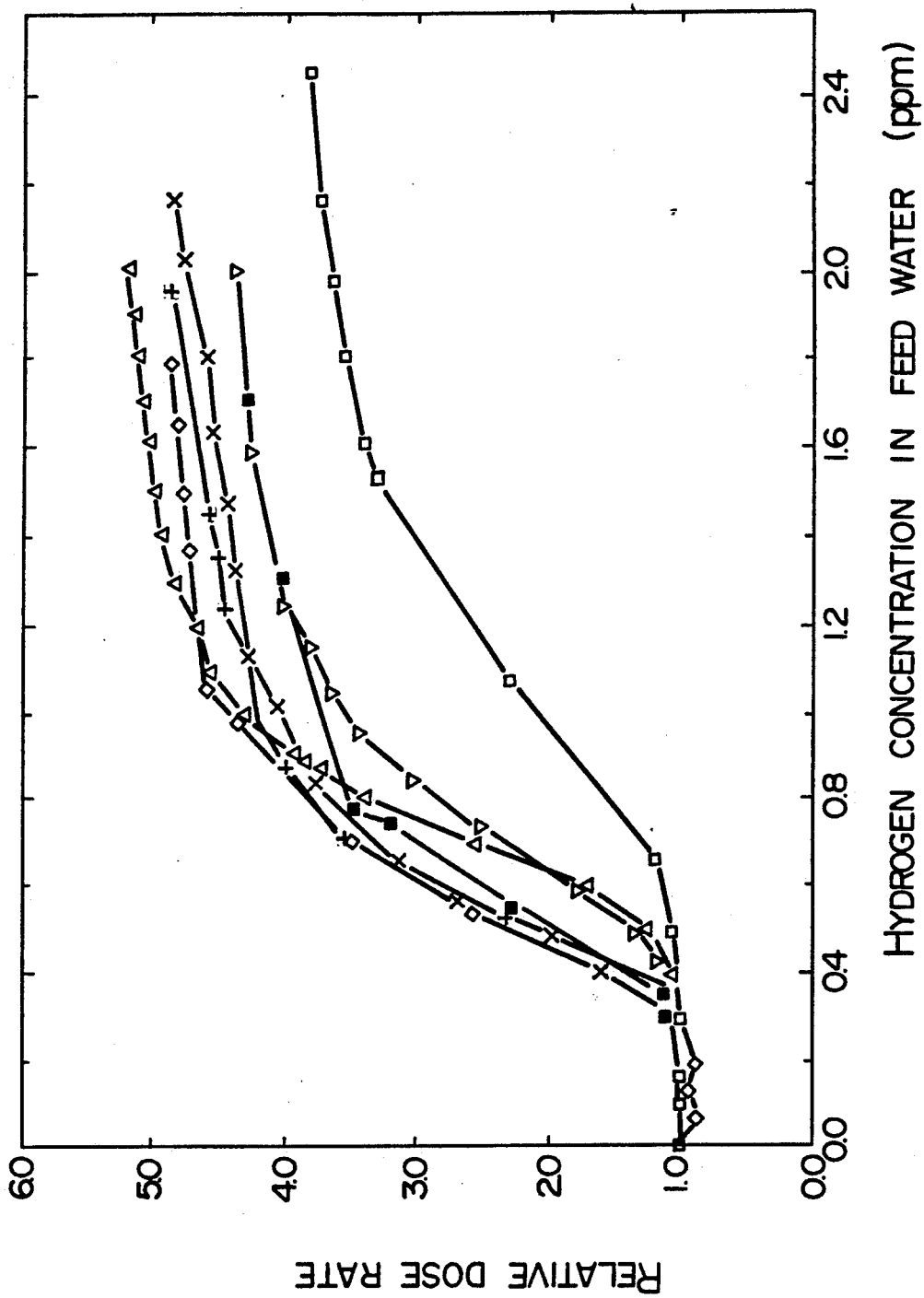
FIG. 3 is a diagram showing changes in dose rate in the turbine system of a boiling water-type nuclear reactor by hydrogen injection.

In FIG. 1, the nitrous acid-injecting apparatus 1 is provided downstream of the condensate water-purifying apparatus 49. Any one of these injection sites can be selected with the same effect in principle, but as to the component whose form is liable to change by any factor in the route up to the core 4 in the pressure vessel 2 of nuclear reactor, for example, hydrogen peroxide, as already explained before, it is preferable to select the injection site near the core 4, such as the control rod-cooling apparatus 12 and the in-reactor instrumentation piping 11. The injected component can be expected to accumulate in the primary cooling system, and thus it is not necessary to inject a large amount of the component from the beginning. That is, the concentration of the component such as nitric acid, nitrous acid, hydrogen peroxide, etc. must be measured with a monitor 13 and an optimum injection rate and an optimum injection amount of the component must be set from the measured concentration and changes in the surface dose rate in a main steam piping 9. When a nitrogen oxide such as NO, $N_2O$, etc. is injected, NOx is discharged through an off-gas line, and thus it is preferable to provide a NOx-treating apparatus 3 in the off-gas line. In FIG. 1, numeral 5 is a recycle piping and 10 a turbine.

Figure 19:
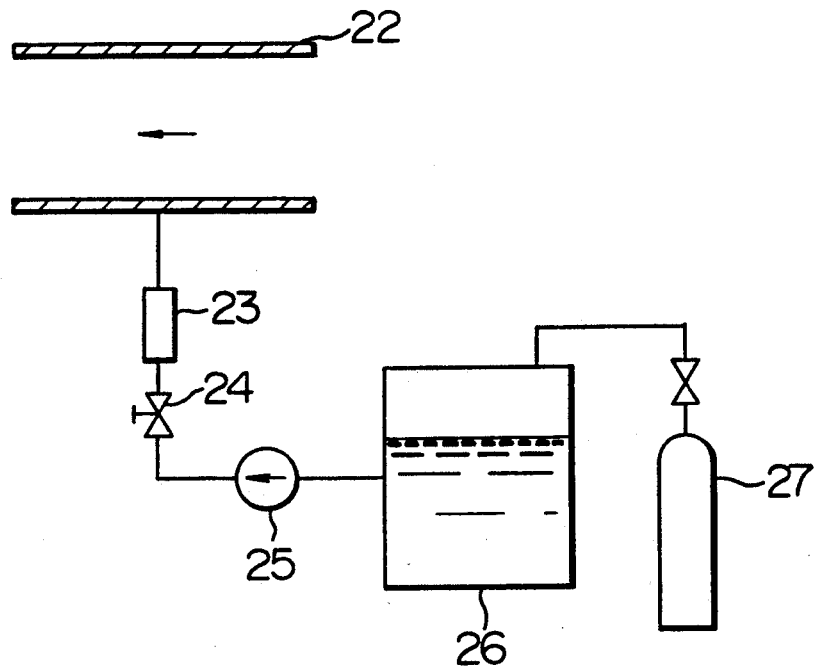
FIG. 19 is a schematic view showing a solution injection apparatus.

FIG. 19 is a block diagram showing the outline of a liquid injection apparatus, where water containing nitric acid, nitrous acid, hydrogen peroxide or the like is stored in a storage tank 26 and injected into the primary cooling piping 22 of nuclear reactor by an injection pump 25. When nitric acid or nitrous acid is used, a gas of corresponding nitrogen oxide from a gas cylinder 27 is dissolved into the water in the storage tank 26 to form nitric acid or nitrous acid. Then, the water containing thus formed nitric acid or nitrous acid is injected into the primary piping 22. When nitric acid or nitrous acid is injected therein, NO is discharged at a rate of 0.3–1 $Nm^3/h$. Thus, enough to meet such a loss, that is, a maximum 20–30 $Nm^3/day$ is quite enough. The injection rate can be controlled by adjusting the degree of opening of a valve 24. In FIG. 19, numeral 23 is a heat exchanger to adjust the temperature of the liquid to be injected.

Figure 20:
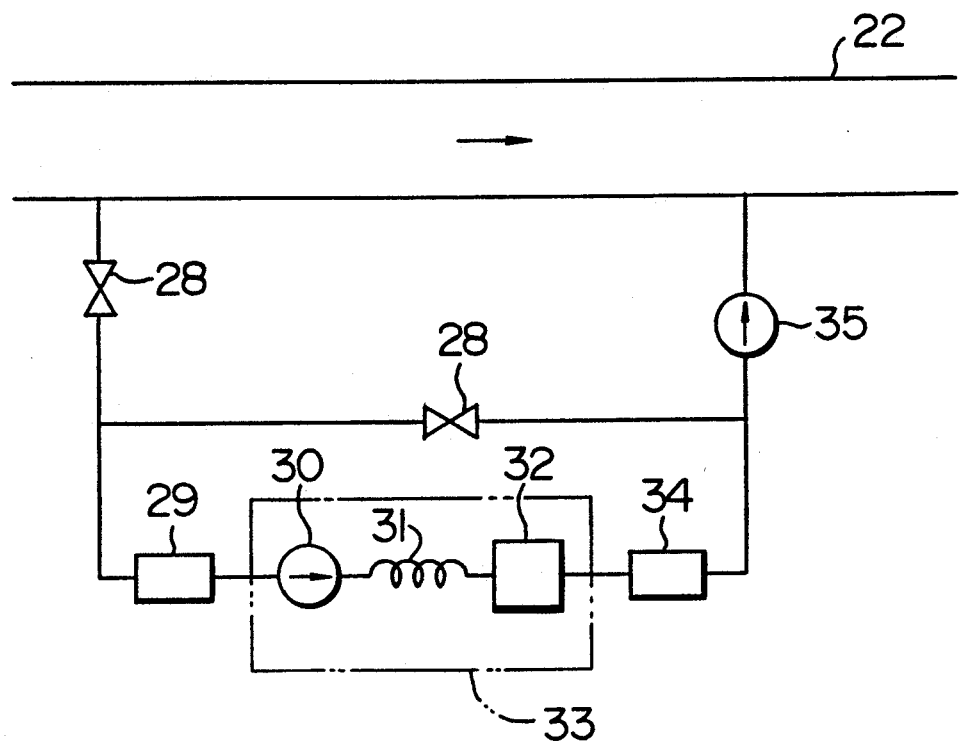
FIG. 20 is a schematic view showing an apparatus for monitoring the concentrations of nitrous acid and nitric acid.

FIG. 20 shows a monitor system for measuring the concentrations of nitric acid and nitrous acid. A portion of water sampled from the primary piping 22 of nuclear reactor is passed through an ion chromatographic apparatus 33 comprising a high pressure, metering pump 30, a separation column 31 and an electroconductivity meter 32 through heat exchangers 29 and 34 provided at both sides of the ion chromatographic apparatus 33 to separate and quantitatively determine nitric acid and nitrous acid, while by-passing the remaining portion of the sample water by adjusting a valve 28. In FIG. 20, numeral 28 is a valve and 35 a feed pump.

Figure 21:
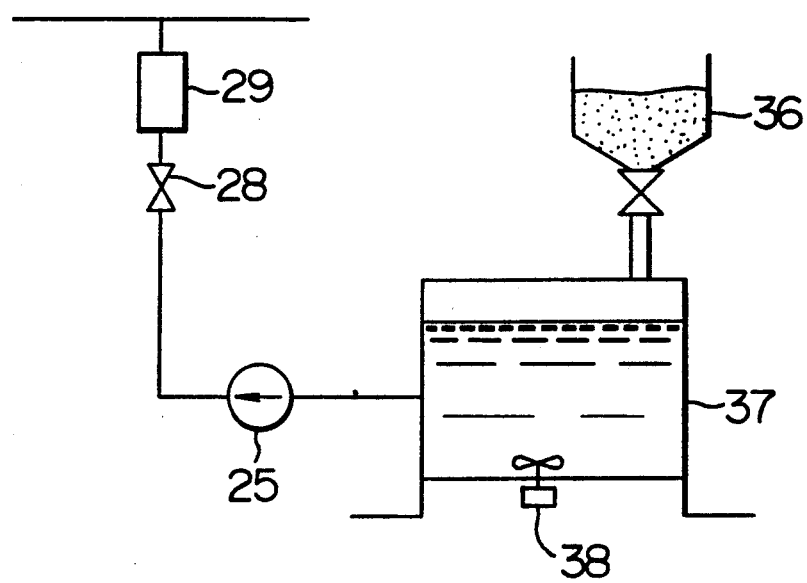
FIG. 21 is a schematic view showing an apparatus for adding a powdery component.

FIG. 21 shows the structure of an injection apparatus, by which an NO-adsorbing or absorbing agent is to be injected.

A powdery NO-adsorbing or absorbing agent is stored in a vessel 36 and supplied to a storage tank 37 as desired. In order to prevent the solid component from precipitation, a stirrer 37 is provided in the storage tank 37 to stir an aqueous suspension contained therein. The aqueous suspension is injected into the primary piping 22 by a feed pump 25 after heating through a heat exchanger 29 in the same manner as in the liquid injection apparatus as in FIG. 19. Numeral 29 is a valve.

Figure 22:
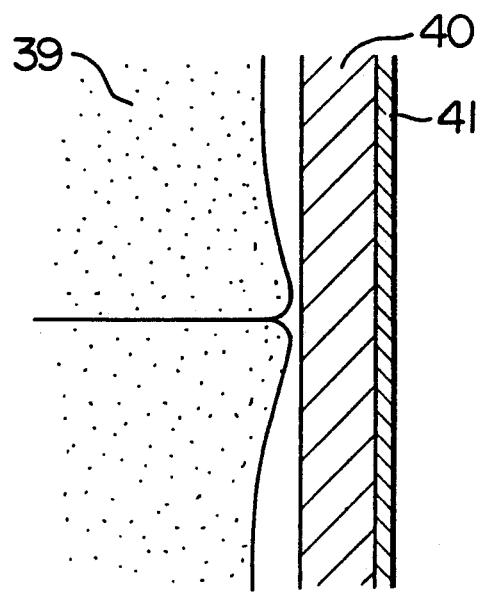
FIG. 22 is a schematic view showing a procedure for accelerating the decomposition of hydrogen peroxide.

FIG. 22 shows a method for accelerating decomposition of hydrogen peroxide generated by radiolysis of water, where a catalyst layer 41 for decomposing hydrogen peroxide, for example, a layer of platinum, a transition metal or the like, is formed on the outer surface of a fuel rod cladding 40. Numeral 39 is a fuel pellet. As another method utilizing a catalyst for the decomposition of hydrogen peroxide, decomposition catalyst powder can be dispersed into the reactor water.

According to the foregoing embodiments, the dose rate can be reduced to about one-tenth, and thus the following advantages can be obtained.

(1) Radiation exposure can be reduced at the inspection of a turbine house during the operation of a nuclear reactor.

(2) Shielding steel plates around the turbine can be reduced in weight or completely omitted, and consequently the working efficiency can be increased and the design strength of the turbine house can be lessened.

(3) Efficiency of normal inspection can be increased by lifting the control regulation of the turbine house into a non-control area.

(4) 4–5 atomic power plants can be built at the site so far for one atomic power plant owing to the reduction of dose rate within the atomic power plant site boundary.

(5) In case of injection of a nitrogen oxide, the effect of oxygen and hydrogen peroxide in the reactor water upon the reduction is also available, and an additional advantage can be obtained for corrosion prevention of materials.

EXAMPLE 2

One embodiment of the present invention as applied to the intermittent reduction of $^{16}N$ dose rate will be described, referring to FIG. 23, where changes with time in the dose rate of turbine system and the concentration of $NO_2^-$ in reactor water are shown when injection of nitrite ions ($NO_2^-$) and injection of hydrogen gas ($H_2$) into the reactor water are alternatingly repeated.

Figure 23:
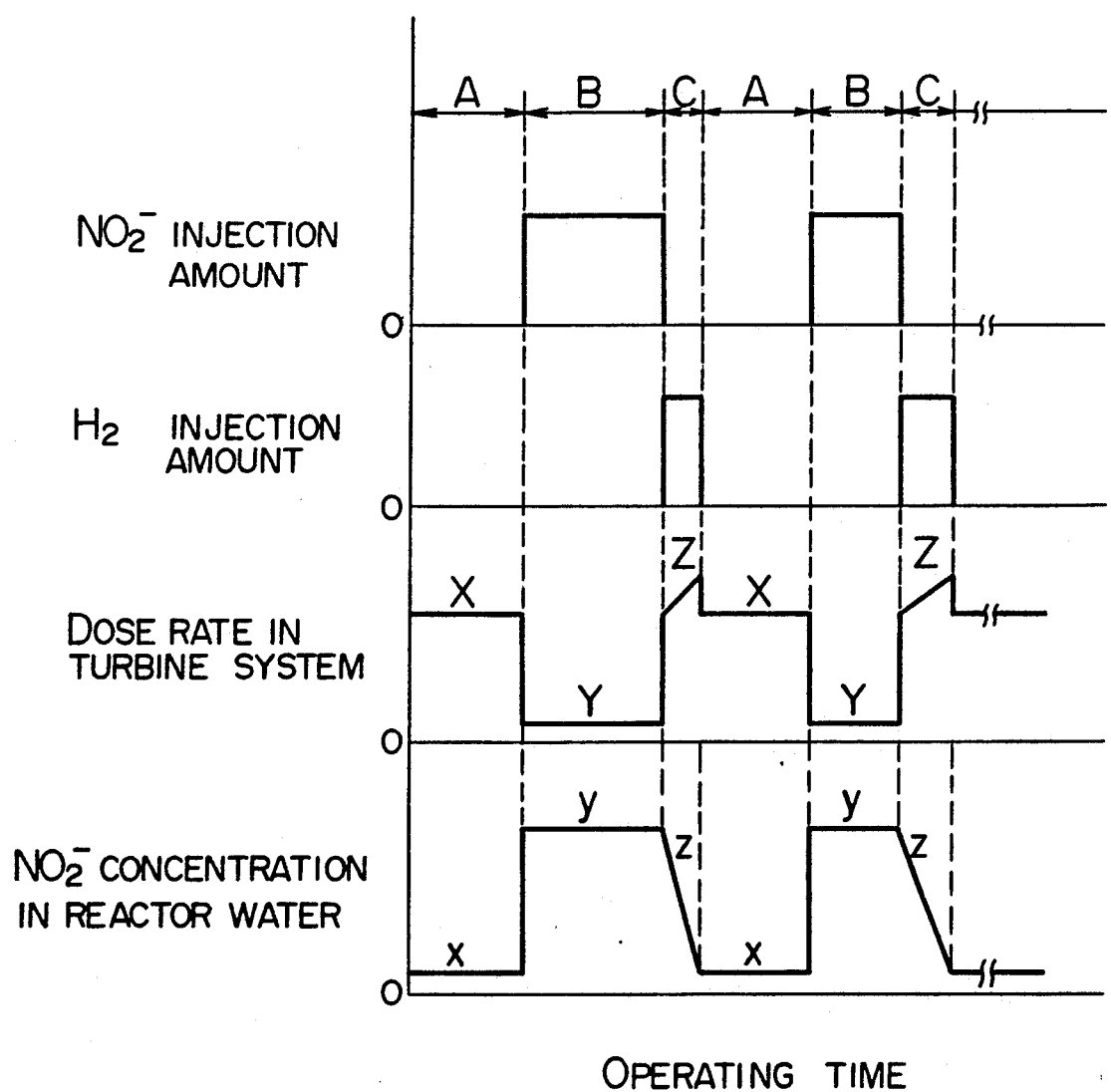
FIG. 23 is a diagram showing an embodiment of applying the present process only to a plant inspection.

In FIG. 23, A shows normal operation, B operation with injection of $NO_2^-$ and C operation with injection of $H_2$. During the normal operation, the dose rate of the turbine system shows a constant level (X) due to $^{16}N$, since $^{16}N$ formed in the reactor water is carried over into the turbine system in the chemical form of $^{16}NO$, while the concentration of $NO_2^-$ in the reactor water is as low as a level in the ppb order (x). During the operation with injection of $NO_2^-$, $^{16}N$ formed in the core water is changed into the chemical form of $^{16}NO_2^-$ or $^{16}NO_3^-$ and dissolved into the reactor water as anions, so that the amount of $^{16}N$ carried over into the turbine system is reduced. Thus, the dosage rate level is lowered from X to Y, while the concentration of $NO_2^-$ in the reactor water is increased to a level in the ppm order (y). During the operation with injection of $H_2$, $NO_2^-$ in the core water is changed into the chemical form of NO, turning into a molecular state (volatile state) and thus is carried over into the turbine system. Thus, the concentration of $NO_2^-$ in the reactor water is gradually lowered from the level (y) to (z), while $^{16}N$ as dissolved in the chemical form of $^{16}NO_2^-$ or $^{16}NO_3^-$ is carried over at the same time, the dose rate level is increased from Y to Z to the contrary. By repeating these operations the dosage rate in the turbine system can be controlled as desired.

FIG. 24 shows changes with time in the concentration of hydrogen atoms in the reactor water, and changes with time in the dose rate in the turbine system and the concentration of $NO_2$ in the reactor water when the injection of $NO_2$ and the injection of $H_2$ into the reactor water are alternatingly repeated.

By injection of $NO_2^-$, the equilibrium concentration of hydrogen atoms is lowered according to the following reaction:

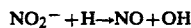

When the concentration of hydrogen atoms is lowered, the radiolysis reaction of N-water system shown in FIG. 25 is shifted toward the oxidation side, and thus $^{16}NO$ is changed into chemical forms of $^{16}NO_2^-$ and $^{16}NO_3^-$, which are dissolved into water. Thus, the dose rate due to $^{16}NO$ carried over into the steam system is also lowered.

By injection of $H_2$, on the other hand, the equilibrium concentration of hydrogen atoms is increased according to the following reaction:

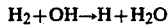

When the concentration of hydrogen atoms is increased, the radiolysis reaction of N-water system as shown in FIG. 25 is shifted toward the reduction side, and thus $NO_2^-$ in the reactor water is changed into the chemical form of NO and carried over into steam, so that the concentration of $NO_2^-$ in the reactor water is lowered. At that time, both $^{16}NO_2^-$ and $^{16}NO_3^-$ are carried over into the steam system in the form of $^{16}NO$, and thus the dose rate is increased. However, the period for the injection of H is much shorter than that for the injection of $NO_2$ and thus a temporary increase in the $^{16}N$ dose rate is negligibly small, as compared with the reduction effect and averaged with the entire plant operation period.

In the foregoing embodiment, $NO_2^-$ is used as a nitrogen oxide to be injected, and injection of such nitrogen compounds as nitrogen monoxide, nitrogen dioxide, nitrogen molecules, dinitrogen nonoxide, etc can suppress formation of $^{16}NO$ in the radiolysis reaction process and can attain the same effect as that of $NO_2^-$.

Furthermore, in the foregoing embodiment, $H_2$ is used as a hydrogen compound to be injected, and injection of such hydrogen compounds as $NH_3$, etc. can promote formation of NO in the radiolysis reaction process and can attain the same effect with that of $H_2$.

In the foregoing embodiment, the concentration of the component to be injected is kept constant with time, but the similar effect can be also obtained even by changing the concentration with time. For example, by making the amount of the component to be injected larger than the normal amount at the initial stage, the injection effect can be obtained earlier In the foregoing embodiment, removal of the nitrogen compound is started at the same time when the injection is discontinued, but the removal operation can be started later after the injection is discontinued, or the injection period and the removal period can be overlapped. However, the injection and removal effect is lowered due to the overlapped period, as compared with the effect attained without the overlapping.

In the foregoing embodiment, the reduction in the concentration of $NO_2^-$ in the reactor water is made through changes in the chemical form, but can be also attained by removal with ion exchange resin, an adsorbing agent, etc. so far usually employed.

EXAMPLE 3

Figure 26:
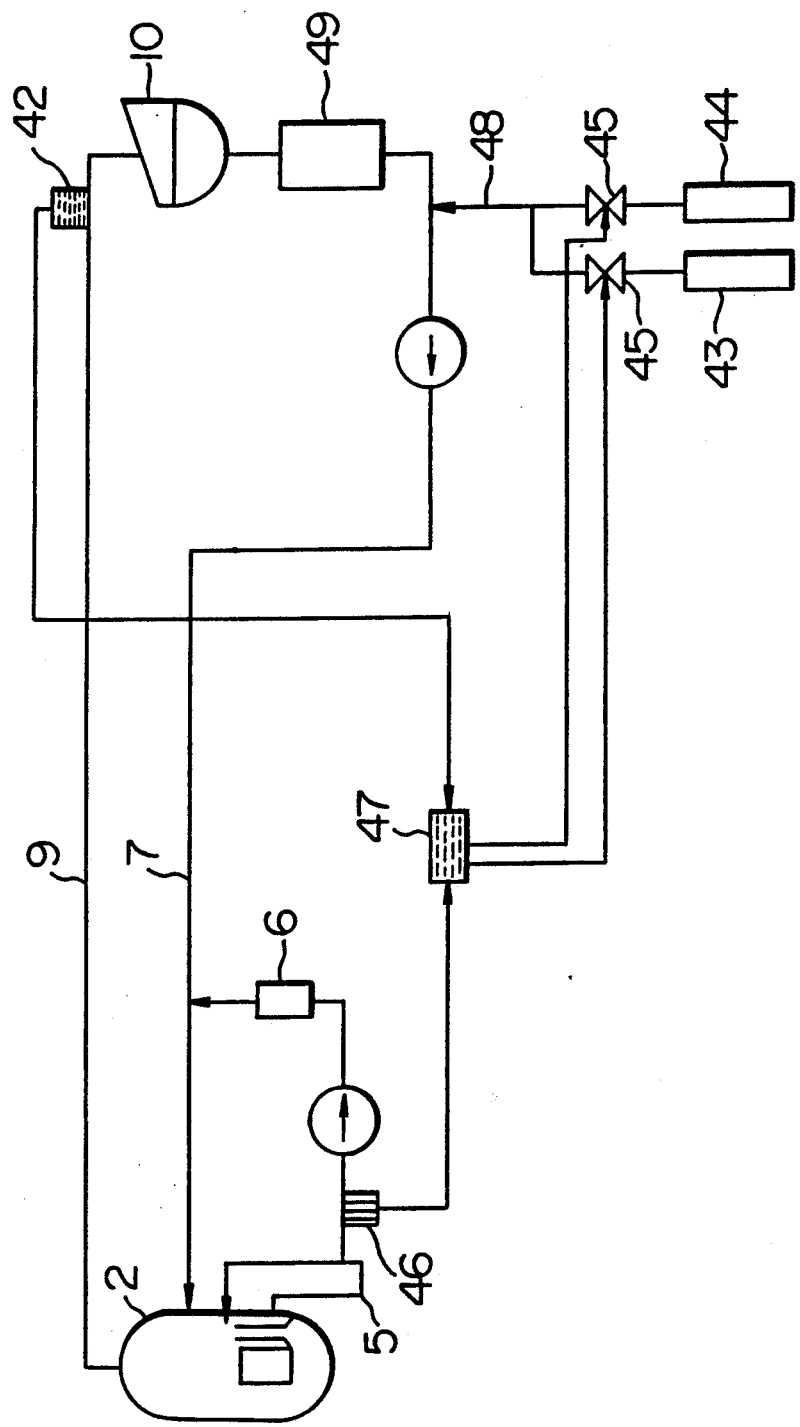
FIG. 26 is a schematic view of a boiling water-type atomic power plant according to the present invention.

The structure of an apparatus according to the present invention as applied to intermittent operation to reduce the $^{16}N$ dose rate is shown in FIG. 26. The apparatus comprises a radiation monitor 42 for measuring the dose rate in the main steam system, a nitrogen compound tank 43, a hydrogen gas cylinder 44, valves 45 for controlling the injection rates of the nitrogen compound and the hydrogen gas, respectively, a corrosion monitor 46 for measuring a corrosion potential at a high temperature, a controller 47 for controlling the injection rates of the nitrogen compound and the hydrogen gas, and an injection line 48 for injecting the nitrogen compound and the hydrogen gas. The corrosion monitor 46 is provided within the boundary of the primary cooling system exposed to a high temperature and a high pressure, for example, upstream of the heat exchanger of the reactor water-purifying system in view of less influence of radiation upon the measurement and good maintenance, thereby measuring a corrosion potential at a high temperature during the normal operation and also during the injection of the nitrogen compound, etc.

The radiation monitor 42 can be provided at any site in the turbine house, so far as the site is near the surface of the main steam piping. The controller 47 controls the degree of opening of the valves 45 for controlling the flow rates on the basis of the corrosion potential and the dose rate in the main steam system, thereby controlling the injection rates of the nitrogen compound and the hydrogen gas. With this apparatus, the operation to inject the nitrogen compound into the reactor water and the operation to reduce the nitrogen compound after the injection is discontinued can be repeatedly carried out.

In the foregoing embodiment, the corrosion potential is used as a control parameter for the optimum control of the amount of $NO_2^-$ to be injected and the optimum control of the amount of $H_2$ to be injected and For example, it is possible to directly measure the concentrations of $NO_2^-$ and $NO_3^-$ or the concentration of hydrogen atoms in the reactor water and use the measurements as control parameters. However, it is harder to exactly monitor the concentrations in the reactor water than to measure the corrosion potential and an expensive monitoring device is required. This is not practical.

In FIG. 26, numeral 48 is an injection line and 49 a condensate water-purifying apparatus.

EXAMPLE 4

A specific operating example of the apparatus shown in FIG. 26 of the present invention will be described below.

FIG. 27 shows processes for monitoring the effect of injection of a nitrogen compound and controlling the injection in the form of a flow chart. According to a process for reducing the dose rate in the main steam system, the injection of the nitrogen compound starts at a preset injection rate of the nitrogen compound. In order to check whether or not the soundness of structural materials of the primary cooling system of nuclear reactor is impaired by the injected nitrogen compound or a nitrogen compound in another chemical form, as formed by a chemical reaction in the core, a corrosion potential at a high temperature is then measured. That is, it is known that the service life of the materials is generally prolonged with a lower corrosion potential. By injecting $NO_2^-$ into the reactor water, the concentration of $NO_2^-$ in the reactor water is increased, and also the concentration of $NO_3^-$, which is a product of further oxidation of $NO_2^-$, is increased. $NO_3^-$ acts as an oxidizing agent to the metallic materials, and as a result, the corrosion potential is increased. Thus, by controlling the corrosion potential so as not to exceed the necessary limit value for assuring the design life of the materials, an impact of $NO_2^-$ injection upon the soundness of the structural material in the reactor can be controlled to a sufficiently low degree. When the measured corrosion potential exceeds the set upper limit, the injection rate of the nitrogen compound is lowered and the corrosion potential is measured again. When the corrosion potential is less than the set upper limit, a dose rate in the main steam system is measured as a next step. When the measured dose rate exceeds the target value, the injection rate of the nitrogen compound is increased and the corrosion potential is measured again. When the dose rate in the main steam system is lower than the target value, the process for reducing the dose rate in the main steam system is completed, and thus an admission to the area around the main steam system is displayed. Even thereafter, the corrosion potential at a high temperature is measured again to check whether or not the corrosion potential is increased by accumulation of the nitrogen compound in the reactor water, and when the corrosion potential is increased, the injection rate of the nitrogen compound is controlled to be reduced as required. By injecting the nitrogen compound according to the foregoing process, the dose rate in the main steam system can be reduced, while maintaining the soundness of the pressure boundary and apparatuses in the primary system of nuclear reactor which is very important from the viewpoint of safety. Exposure to radiation of workers who have access to the area of the main steam system during the operation of nuclear reactor can be reduced.

After the completion of working in the area of the main steam system, it is necessary to discontinue the injection of the nitrogen compound to make the corrosion potential at a high temperature as low as possible. Such a process starts by discontinuing the injection of the nitrogen compound. Then, in order to remove the nitrogen compound remaining in the reactor water as soon as possible, injection of hydrogen starts. The corrosion potential at a high temperature is measured during the injection of hydrogen, and the injection of hydrogen is discontinued when the measured potential becomes less than the set valve. Thus, the whole process is finished. Why the injection of hydrogen is carried out is that the injected hydrogen reacts with the nitrogen compound having a high solubility in the reactor water to change the chemical form of the nitrogen compound into volatile ammonia, etc. Thus, the nitrogen compound remaining in the reactor water is rapidly transferred into the gas phase, so that there is no nitrogen compound in the reactor water. That is, the corrosion potential can be returned to the level before the injection of the nitrogen compound.

When the nitrogen compound is injected into feed water, it is desirable to inject it into the feed water downstream of the condensate water-purifying apparatus 49 in order to prevent any decrease of the injected nitrogen compound through the condensate water-purifying apparatus and also prevent shortening of the life of the condensate water-purifying apparatus.

When it is expectable that the exchange capacity of anion exchange resin (usually OH-form, strongly basic anion exchange resin) in the reactor water-purifying apparatus is reduced by adsorption and exchange of the nitrogen compound ions and its life is shortened thereby, it is desirable to use an anion exchange resin, where ion exchange group is converted to $NO_2$ form, in place of the OH form, strongly basic anion exchange resin, thereby solving the problem of the shortened life of the anion exchange resin in the reactor water-purifying apparatus and preventing any loss of the injected nitrogen compound in the reactor water-purifying apparatus at the same time. That is, the effect of injection of a nitrogen compound can be obtained thereby. Even if an anion exchange resin whose ion exchange group is converted to the $NO_2$ form is used in the reactor water-purifying apparatus, a satisfactory capacity to remove chloride ions, etc. as a proper function of the anion exchange resin in the reactor water-purifying apparatus can be obtained owing to the ion selectivity of the ion exchange group.

Figure 28:
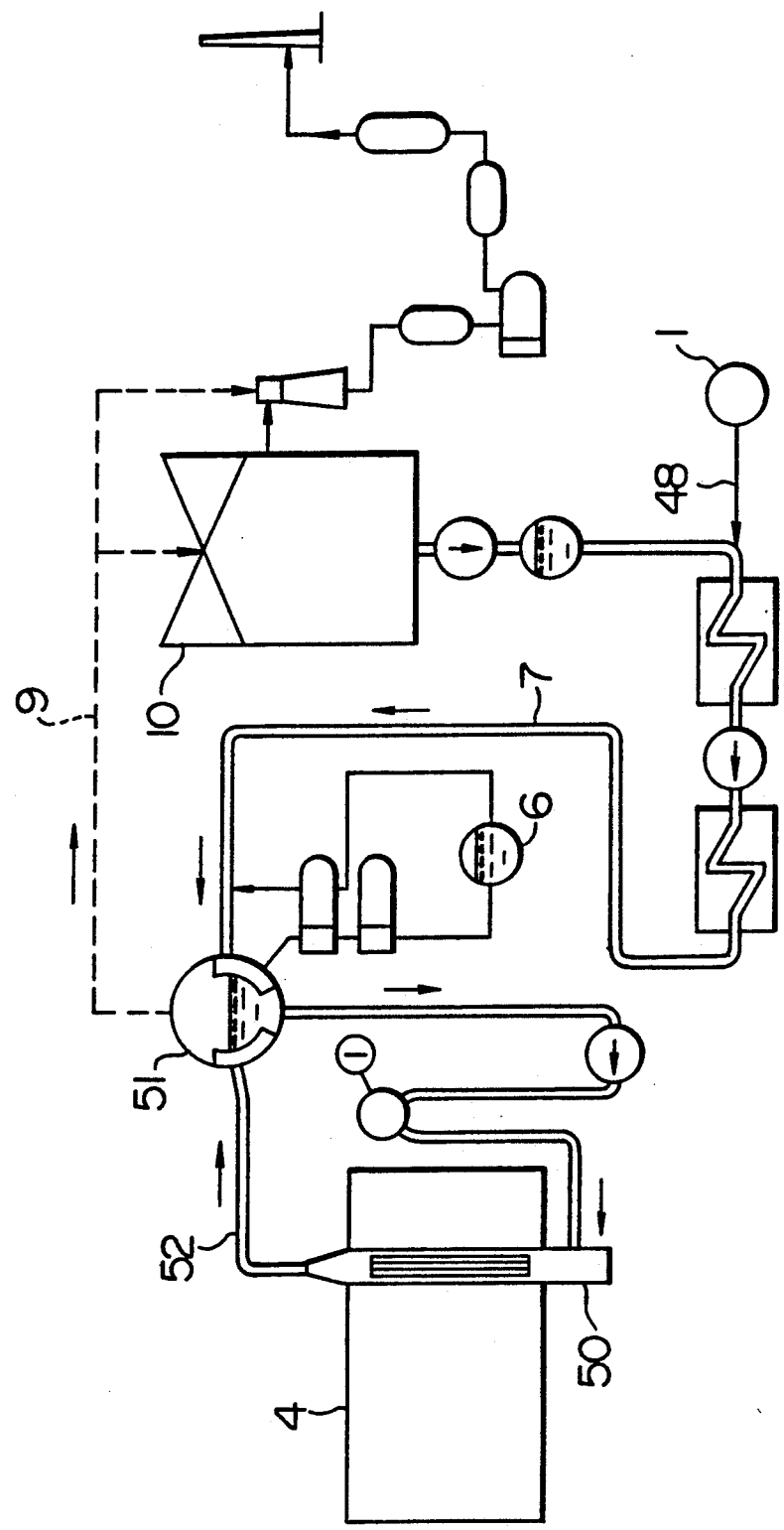
FIG. 28 is a schematic view of an advanced thermal reactor according to the present invention.

FIG. 28 shows a further embodiment of the present invention as applied to an advanced thermal reactor similar to the boiling water type, nuclear reactor, where a core 4 comprises a bundle of pressure tubes 50 and steam is separated in a steam drum 51 to drive a turbine 10. $^{16}N$ generated in the core 4 is transferred into a main steam system 9 according to the same mechanism as that of the boiling water type, nuclear reactor. Thus, an injector 1 is provided at a position in a feed water piping 7 to inject nitrous acid, hydrogen or the like into the feed water, and the $^{16}N$ carry-over into the main steam system 9 can be suppressed thereby. By providing an adsorbing agent of nitrogen compound in the ascending pipe 52, the $^{16}N$ carry-over can be also controlled.

According to the present invention, the carry-over from a nuclear reactor into the main steam system of the radioactive nitrogen atom $^{16}N$, generated by neutron irradiation of the oxygen atoms in the water molecules of reactor water can be remarkably controlled and the dose rate in the main steam system can be largely reduced. Furthermore, the space dose rate in the turbine house can be reduced, thereby making the entire turbine house smaller.

Still furthermore, if the present method is applied only to the inspection of an atomic power plant, where the dose rate of the turbine house is not so much reduced, its operating control can be correspondingly simplified.

What is claimed is:

1. A direct cycle type, atomic power plant, which comprises:
 a nuclear reactor pressure vessel provided with a nuclear fuel and reactor water therein;
 a turbine for driving a generator by steam from the nuclear reactor pressure vessel;
 a condenser for condensing the steam from the turbine;
 means for supplying water from the condenser to the nuclear reactor pressure vessel; and
 injection means for injecting into the reactor water an amount of a substance capable of suppressing transfer from a liquid phase to a vapor phase of radioactive nitrogen oxides generated in the reactor water by irradiation of the reactor water with neutrons generated during nuclear reactions of the nuclear fuel; and
 means for controlling said injection means such that the amount of said substance is controlled so that the concentration of nitrous acid or nitric acid in the reactor water can fall within a preset range.

2. A direct cycle type, atomic power according to claim 1, wherein the radioactive nitrogen oxides are molecular radioactive nitrogen oxides.

3. A direct cycle type, atomic power plant according to claim 1, wherein the radioactive nitrogen oxides include nitrogen monoxide.

4. A direct cycle type, atomic power plant which comprises a means for adding a hydrogen radical scavenger to convert radioactive nitrogen oxide in reactor water to anions, as provided in the core of a nuclear reactor of the direct cycle type, atomic power plant wherein the means for adding comprises a source of hydrogen radical scavenger and a means for injecting into the reactor water the hydrogen radical scavenger having a function to lower a concentration of hydrogen atoms through reaction with hydrogen atoms in the reactor water and, wherein the hydrogen radical scavenger is at least one of nitrogen monoxide and nitrogen dioxide.

5. A direct cycle-type, atomic power plan according to claim 4, wherein said hydrogen radical scavenger is nitrogen monoxide.

6. A direct cycle-type, atomic power plant according to claim 4, wherein said hydrogen radical scavenger is nitrogen dioxide.

7. A direct cycle-type, atomic power plant according to claim 4, further comprising a corrosion monitor for measuring a corrosion potential of structural material in said reactor water and means for controlling said means for adding based on a measured value of said corrosion potential.

8. A direct cycle-type, atomic power plant, which comprises:
 a nuclear reactor pressure vessel provided with a nuclear fuel and reactor water therein;
 a turbine for driving a generator by steam from the nuclear reactor pressure vessel;
 a condenser for condensing the steam from the turbine;
 means for supplying water from the condenser to the nuclear reactor pressure vessel;
 injection means for injecting into the reactor water at least one nitrogen compound selected from the group consisting of nitrogen monoxide, nitrogen dioxide, nitrogen molecules, dinitrogen monoxide and nitrous acid; and
 means for controlling the injection rate of the nitrogen compound so that the concentration of nitrous acid or nitric acid in the reactor water can fall within a preset range.

9. A direct cycle-type, atomic power plant according to claim 8, wherein said at least one nitrogen compound is nitrogen monoxide.

10. A direct cycle-type, atomic power plant according to claim 8, wherein said at least one nitrogen compound is nitrogen dioxide.

11. A direct cycle type, atomic power plant, which comprises:
- a nuclear reactor pressure vessel provided with a nuclear fuel and reactor water therein;
- a turbine for driving a generator by steam from the nuclear reactor pressure vessel;
- a condenser for condensing the steam from the turbine;
- means for supplying water from the condenser to the nuclear reactor pressure vessel; and
- injection means for injecting at least one of nitrogen monoxide and nitrogen dioxide into the reactor water during plant operation for suppressing transfer from a liquid phase to a vapor phase of radioactive nitrogen oxides generated in the reactor water by irradiation of the reactor water with neutrons generated during nuclear reactions of the nuclear fuel in the presence of NO in the reactor water during plant operation.

12. A direct cycle type, atomic power plant, which comprises:
- a nuclear reactor pressure vessel provided with a nuclear fuel and reactor water therein;
- a turbine for driving a generator by steam from the nuclear reactor pressure vessel;
- a condenser for condensing the steam from the turbine;
- means for supplying water from the condenser to the nuclear reactor pressure vessel; and
- means for injecting at least one of nitrogen monoxide and nitrogen dioxide into the reactor water during plant operation for suppressing transfer from a liquid phase to a vapor phase of radioactive nitrogen oxides generated in the reactor water by irradiation of the reactor water with neutrons generated during nuclear reactions of the nuclear fuel in the presence of $NO_2$ in the reactor water during plant operation.

* * * * *

UNITED STATES PATENT AND TRADEMARK OFFICE
CERTIFICATE OF CORRECTION

PATENT NO. : 5,084,235

DATED : January 28, 1992

INVENTOR(S) : IBE et al

It is certified that error appears in the above-identified patent and that said Letters Patent is hereby corrected as shown below:

On the title page:

[75] Change "Maroto" Nagase to read --Makoto" Nagase--.

Signed and Sealed this

Third Day of August, 1993

Attest:

MICHAEL K. KIRK

Attesting Officer     Acting Commissioner of Patents and Trademarks